(12) United States Patent
Andriola et al.

(10) Patent No.: US 12,440,656 B2
(45) Date of Patent: Oct. 14, 2025

(54) POWER MANAGEMENT FOR INTERATRIAL SHUNTS AND ASSOCIATED SYSTEMS AND METHODS

(71) Applicant: Shifamed Holdings, LLC, Campbell, CA (US)

(72) Inventors: Peter Andriola, Castro Valley, CA (US); Brian Fahey, Menlo Park, CA (US)

(73) Assignee: Shifamed Holdings, LLC, Campbell, CA (US)

( * ) Notice: Subject to any disclaimer, the term of this patent is extended or adjusted under 35 U.S.C. 154(b) by 544 days.

(21) Appl. No.: 17/919,226

(22) PCT Filed: Apr. 23, 2021

(86) PCT No.: PCT/US2021/028931
§ 371 (c)(1),
(2) Date: Oct. 14, 2022

(87) PCT Pub. No.: WO2021/217059
PCT Pub. Date: Oct. 28, 2021

(65) Prior Publication Data
US 2023/0158280 A1    May 25, 2023

Related U.S. Application Data

(60) Provisional application No. 63/014,340, filed on Apr. 23, 2020.

(51) Int. Cl.
*A61M 27/00* (2006.01)

(52) U.S. Cl.
CPC ... *A61M 27/002* (2013.01); *A61M 2205/3334* (2013.01); *A61M 2205/3523* (2013.01);
(Continued)

(58) Field of Classification Search
CPC ........... A61B 2017/00017; A61B 2017/00137; A61B 2017/00146; A61B 2017/00176;
(Continued)

(56) References Cited

U.S. PATENT DOCUMENTS 3,874,388 A    4/1975    King et al.
4,601,309 A    7/1986    Chang
(Continued)

FOREIGN PATENT DOCUMENTS

AU    2005211243    8/2005
AU    2010344182    8/2012
(Continued)

OTHER PUBLICATIONS

Jodi Perkins, "Corvia Medical and physIQ Partner in Global Phase 3 Heart Failure Clinical Trial to Leverage Novel Digital Endpoints," Press Release, 2019 Copyright, Medical Alley Association, 3 pages.
(Continued)

*Primary Examiner* — Susan S Su
*Assistant Examiner* — Erin A Kim
(74) *Attorney, Agent, or Firm* — Perkins Coie LLP

(57) ABSTRACT

The present technology relates to power management for interatrial shunting systems. In some embodiments, the present technology includes a system for shunting blood between a left atrium and a right atrium of a patient. The system can include a shunting element and a plurality of active electronic components operably coupled to the shunting element. At least some of the active electronic components have different power consumption characteristics. The system also includes a plurality of energy storage components, with some of the energy storage components have different characteristics. During operation, the system is configured to receive a signal indicating that an active electronic component is to be operated, and select an energy
(Continued)

storage component associated with power output characteristics capable of accommodating the power consumption characteristics of the active electronic component. The system is further configured to instruct the selected energy storage component to power operation of the active electronic component.

26 Claims, 4 Drawing Sheets

(52) U.S. Cl.
CPC . *A61M 2205/50* (2013.01); *A61M 2205/8212* (2013.01); *A61M 2210/125* (2013.01)

(58) Field of Classification Search
CPC ........ A61B 5/0215; A61M 2205/8206; A61M 2205/8212; A61M 27/002; A61M 2205/3334; A61M 2205/50; A61M 2210/125; A61F 2/2476
See application file for complete search history.

(56) References Cited

U.S. PATENT DOCUMENTS

| | | | |
|---|---|---|---|
| 4,662,355 A | 5/1987 | Pieronne et al. |
| 4,705,507 A | 11/1987 | Boyles |
| 4,836,204 A | 6/1989 | Landymore et al. |
| 4,979,955 A | 12/1990 | Smith |
| 4,995,857 A | 2/1991 | Arnold |
| 5,186,431 A | 2/1993 | Tamari |
| 5,197,978 A | 3/1993 | Hess |
| 5,267,940 A | 12/1993 | Moulder |
| 5,290,227 A | 3/1994 | Pasque |
| 5,312,341 A | 5/1994 | Turi |
| 5,326,374 A | 7/1994 | Ilbawi et al. |
| 5,332,402 A | 7/1994 | Teitelbaum |
| 5,334,217 A | 8/1994 | Das |
| 5,409,019 A | 4/1995 | Wilk |
| 5,429,144 A | 7/1995 | Wilk |
| 5,500,015 A | 3/1996 | Deac |
| 5,531,759 A | 7/1996 | Kensey et al. |
| 5,545,137 A | 8/1996 | Rudie et al. |
| 5,556,386 A | 9/1996 | Todd |
| 5,584,803 A | 12/1996 | Stevens et al. |
| 5,597,377 A | 1/1997 | Aldea |
| 5,611,338 A | 3/1997 | Gallup |
| 5,645,559 A | 7/1997 | Hachtman et al. |
| 5,655,548 A | 8/1997 | Nelson et al. |
| 5,662,711 A | 9/1997 | Douglas |
| 5,702,412 A | 12/1997 | Popov et al. |
| 5,725,552 A | 3/1998 | Kotula et al. |
| 5,741,297 A | 4/1998 | Simon |
| 5,795,307 A | 8/1998 | Krueger |
| 5,810,836 A | 9/1998 | Hussein et al. |
| 5,814,089 A | 9/1998 | Stokes et al. |
| 5,824,071 A | 10/1998 | Nelson et al. |
| 5,916,193 A | 6/1999 | Stevens et al. |
| 5,941,850 A | 8/1999 | Shah et al. |
| 5,944,019 A | 8/1999 | Kundson et al. |
| 5,948,006 A | 9/1999 | Mann |
| 5,949,632 A | 9/1999 | Barreras et al. |
| 5,957,949 A | 9/1999 | Leonhardt et al. |
| 6,039,759 A | 3/2000 | Carpentier et al. |
| 6,066,163 A | 5/2000 | John |
| 6,067,474 A | 5/2000 | Schulman et al. |
| 6,077,298 A | 6/2000 | Tu et al. |
| 6,099,495 A | 8/2000 | Kinghorn et al. |
| 6,120,534 A | 9/2000 | Ruiz |
| 6,126,686 A | 10/2000 | Badylak et al. |
| 6,165,188 A | 12/2000 | Saadat et al. |
| 6,165,209 A | 12/2000 | Patterson et al. |
| 6,166,518 A | 12/2000 | Echarri et al. |
| 6,210,318 B1 | 4/2001 | Lederman |
| 6,217,541 B1 | 4/2001 | Yu |
| 6,240,316 B1 | 5/2001 | Richmond et al. |
| 6,240,322 B1 | 5/2001 | Peterfeso et al. |
| 6,242,762 B1 | 6/2001 | Brown et al. |
| 6,254,564 B1 | 7/2001 | Wilk et al. |
| 6,259,951 B1 | 7/2001 | Kuzma et al. |
| 6,260,552 B1 | 7/2001 | Mortier et al. |
| 6,270,526 B1 | 8/2001 | Cox |
| 6,277,078 B1 | 8/2001 | Porat et al. |
| 6,302,892 B1 | 10/2001 | Wilk |
| 6,328,699 B1 | 12/2001 | Eigler et al. |
| 6,344,022 B1 | 2/2002 | Jarvik |
| 6,354,991 B1 | 3/2002 | Gross et al. |
| 6,358,277 B1 | 3/2002 | Duran |
| 6,381,496 B1 | 4/2002 | Meadows et al. |
| 6,406,422 B1 | 6/2002 | Landesberg |
| 6,447,539 B1 | 9/2002 | Nelson et al. |
| 6,451,051 B2 | 9/2002 | Drasler et al. |
| 6,458,153 B1 | 10/2002 | Bailey et al. |
| 6,468,303 B1 | 10/2002 | Amplatz et al. |
| 6,478,776 B1 | 11/2002 | Rosenman et al. |
| 6,491,705 B2 | 12/2002 | Gifford, III et al. |
| 6,516,227 B1 | 2/2003 | Meadows et al. |
| 6,527,698 B1 | 3/2003 | Kung et al. |
| 6,544,208 B2 | 4/2003 | Ethier et al. |
| 6,562,066 B1 | 5/2003 | Martin |
| 6,572,652 B2 | 6/2003 | Shaknovich |
| 6,589,198 B1 | 7/2003 | Soltanpour et al. |
| 6,622,048 B1 | 9/2003 | Mann et al. |
| 6,632,169 B2 | 10/2003 | Korakianitis et al. |
| 6,638,303 B1 | 10/2003 | Campbell |
| 6,641,610 B2 | 11/2003 | Wolf et al. |
| 6,650,943 B1 | 11/2003 | Whitehurst et al. |
| 6,652,578 B2 | 11/2003 | Bailey et al. |
| 6,685,664 B2 | 2/2004 | Levin et al. |
| 6,712,836 B1 | 3/2004 | Berg et al. |
| 6,733,485 B1 | 5/2004 | Whitehurst et al. |
| 6,735,474 B1 | 5/2004 | Loeb et al. |
| 6,735,475 B1 | 5/2004 | Kuzma et al. |
| 6,782,292 B2 | 8/2004 | Whitehurst |
| 6,783,499 B2 | 8/2004 | Schwartz |
| 6,788,975 B1 | 9/2004 | Whitehurst et al. |
| 6,820,019 B1 | 11/2004 | Kelly et al. |
| 6,832,114 B1 | 12/2004 | Whitehurst et al. |
| 6,845,267 B2 | 1/2005 | Harrison et al. |
| 6,862,479 B1 | 3/2005 | Whitehurst et al. |
| 6,871,099 B1 | 3/2005 | Kuzma et al. |
| 6,885,895 B1 | 4/2005 | Whitehurst et al. |
| 6,909,920 B2 | 6/2005 | Lokhoff et al. |
| 6,911,043 B2 | 6/2005 | Myers et al. |
| 6,922,590 B1 | 7/2005 | Whitehurst |
| 6,926,670 B2 | 8/2005 | Rich et al. |
| 6,937,891 B2 | 8/2005 | Rodriguez et al. |
| 6,950,706 B2 | 9/2005 | Jensen et al. |
| 6,950,707 B2 | 9/2005 | Whitehurst |
| 6,970,741 B1 | 11/2005 | Whitehurst et al. |
| 7,001,409 B2 | 2/2006 | Amplatz |
| 7,003,352 B1 | 2/2006 | Whitehurst |
| 7,011,095 B2 | 3/2006 | Wolf et al. |
| 7,013,177 B1 | 3/2006 | Meadows et al. |
| 7,024,246 B2 | 4/2006 | Acosta et al. |
| 7,054,689 B1 | 5/2006 | Whitehurst et al. |
| 7,054,691 B1 | 5/2006 | Kuzma et al. |
| 7,056,294 B2 | 6/2006 | Khairkhahan et al. |
| 7,070,577 B1 | 7/2006 | Haller et al. |
| 7,089,057 B2 | 8/2006 | Heathershaw et al. |
| 7,110,821 B1 | 9/2006 | Ross |
| 7,136,701 B2 | 11/2006 | Greatbatch et al. |
| 7,146,209 B2 | 12/2006 | Gross et al. |
| 7,149,587 B2 | 12/2006 | Wardle et al. |
| 7,149,773 B2 | 12/2006 | Haller et al. |
| 7,151,961 B1 | 12/2006 | Mcclure et al. |
| 7,155,279 B2 | 12/2006 | Whitehurst et al. |
| 7,155,284 B1 | 12/2006 | Whitehurst et al. |
| 7,167,751 B1 | 1/2007 | Whitehurst et al. |
| 7,175,656 B2 | 2/2007 | Khairkhahan |
| 7,177,698 B2 | 2/2007 | Klosterman et al. |
| 7,203,548 B2 | 4/2007 | Bradley et al. |
| 7,254,449 B2 | 8/2007 | Karunasiri |

(56) References Cited

U.S. PATENT DOCUMENTS

| | | |
|---|---|---|
| 7,270,675 B2 | 9/2007 | Chun et al. |
| 7,292,890 B2 | 11/2007 | Bradley et al. |
| 7,294,115 B1 | 11/2007 | Wilk |
| 7,308,303 B2 | 12/2007 | Whitehurst et al. |
| 7,311,690 B2 | 12/2007 | Burnett |
| 7,311,730 B2 | 12/2007 | Gabbay |
| 7,317,947 B2 | 1/2008 | Wahlstrand et al. |
| 7,317,951 B2 | 1/2008 | Schneider et al. |
| 7,330,756 B2 | 2/2008 | Marnfeldt |
| 7,337,003 B2 | 2/2008 | Malinowski |
| 7,349,741 B2 | 3/2008 | Maltan et al. |
| 7,389,134 B1 | 6/2008 | Karicherla et al. |
| 7,390,310 B2 | 6/2008 | McCusker et al. |
| 7,433,737 B2 | 10/2008 | He et al. |
| 7,437,193 B2 | 10/2008 | Parramon et al. |
| 7,444,180 B2 | 10/2008 | Kuzma et al. |
| 7,481,759 B2 | 1/2009 | Whitehurst et al. |
| 7,483,746 B2 | 1/2009 | Lee et al. |
| 7,483,748 B2 | 1/2009 | Torgerson et al. |
| 7,498,516 B1 | 3/2009 | He |
| 7,513,908 B2 | 4/2009 | Lattouf |
| 7,524,329 B2 | 4/2009 | Rucker |
| 7,524,330 B2 | 4/2009 | Berreklouw |
| 7,524,332 B2 | 4/2009 | Osborne et al. |
| 7,532,936 B2 | 5/2009 | Erickson et al. |
| 7,608,067 B2 | 10/2009 | Bonni |
| 7,610,100 B2 | 10/2009 | Jaax et al. |
| 7,617,001 B2 | 11/2009 | Penner et al. |
| 7,634,318 B2 | 12/2009 | Tran et al. |
| 7,658,747 B2 | 2/2010 | Forde et al. |
| 7,672,732 B2 | 3/2010 | Sun et al. |
| 7,684,867 B2 | 3/2010 | Whitehurst et al. |
| 7,699,059 B2 | 4/2010 | Fonseca et al. |
| 7,706,892 B2 | 4/2010 | Haller et al. |
| 7,729,758 B2 | 6/2010 | Parramon et al. |
| 7,736,327 B2 | 6/2010 | Wilk et al. |
| 7,742,817 B2 | 6/2010 | Malinowski et al. |
| 7,761,165 B1 | 7/2010 | Haller et al. |
| 7,769,467 B1 | 8/2010 | Emadi et al. |
| 7,777,641 B2 | 8/2010 | Karunasiri et al. |
| 7,780,725 B2 | 8/2010 | Haug et al. |
| 7,783,359 B2 | 8/2010 | Meadows |
| 7,794,473 B2 | 9/2010 | Tessmer et al. |
| 7,801,602 B2 | 9/2010 | Mcclure et al. |
| 7,803,021 B1 | 9/2010 | Brase |
| 7,805,200 B2 | 9/2010 | Kast et al. |
| 7,805,202 B2 | 9/2010 | Kuzma et al. |
| 7,806,921 B2 | 10/2010 | Hoffman |
| 7,813,804 B1 | 10/2010 | Jaax |
| 7,818,060 B2 | 10/2010 | Torgerson |
| 7,835,803 B1 | 11/2010 | Malinowski et al. |
| 7,840,268 B2 | 11/2010 | Blischak et al. |
| 7,840,279 B2 | 11/2010 | He |
| 7,853,321 B2 | 12/2010 | Whitehurst et al. |
| 7,857,819 B2 | 12/2010 | Jaax et al. |
| 7,860,570 B2 | 12/2010 | Whitehurst et al. |
| 7,860,579 B2 | 12/2010 | Goetzinger et al. |
| 7,877,136 B1 | 1/2011 | Moffitt et al. |
| 7,892,246 B2 | 2/2011 | Akin et al. |
| 7,905,901 B2 | 3/2011 | Corcoran et al. |
| 7,922,764 B2 | 4/2011 | Gordy et al. |
| 7,938,840 B2 | 5/2011 | Golden et al. |
| 7,941,227 B2 | 5/2011 | Barker |
| 7,945,323 B2 | 5/2011 | Jaax et al. |
| 7,957,805 B2 | 6/2011 | He |
| 7,967,769 B2 | 6/2011 | Faul et al. |
| 7,974,706 B2 | 7/2011 | Moffitt et al. |
| 7,988,724 B2 | 8/2011 | Salahieh et al. |
| 7,991,483 B1 | 8/2011 | Atanasoska et al. |
| 8,012,198 B2 | 9/2011 | Hill et al. |
| 8,016,877 B2 | 9/2011 | Seguin et al. |
| 8,019,443 B2 | 9/2011 | Schleicher et al. |
| 8,027,735 B1 | 9/2011 | Tziviskos et al. |
| 8,043,360 B2 | 10/2011 | McNamara et al. |
| 8,046,073 B1 | 10/2011 | Pianca |
| 8,060,209 B2 | 11/2011 | Digiore et al. |
| 8,070,708 B2 | 12/2011 | Rottenberg et al. |
| 8,086,307 B2 | 12/2011 | Virag et al. |
| 8,091,556 B2 | 1/2012 | Keren et al. |
| 8,096,959 B2 | 1/2012 | Stewart et al. |
| 8,099,168 B2 | 1/2012 | Roche |
| 8,145,314 B2 | 3/2012 | Mcdonald |
| 8,147,545 B2 | 4/2012 | Avior |
| 8,157,860 B2 | 4/2012 | McNamara et al. |
| 8,172,896 B2 | 5/2012 | McNamara et al. |
| 8,175,710 B2 | 5/2012 | He |
| 8,175,717 B2 | 5/2012 | Haller et al. |
| 8,192,418 B2 | 6/2012 | Robinson et al. |
| 8,209,017 B1 | 6/2012 | Mcdonald |
| 8,219,196 B2 | 7/2012 | Torgerson |
| 8,235,916 B2 | 8/2012 | Whiting et al. |
| 8,235,933 B2 | 8/2012 | Keren et al. |
| 8,244,377 B1 | 8/2012 | Pianca et al. |
| 8,246,677 B2 | 8/2012 | Ryan |
| 8,252,042 B2 | 8/2012 | McNamara et al. |
| 8,260,412 B2 | 9/2012 | Krause et al. |
| 8,260,432 B2 | 9/2012 | Digiore et al. |
| 8,260,434 B2 | 9/2012 | Digiore et al. |
| 8,265,771 B2 | 9/2012 | Donofrio et al. |
| 8,271,089 B2 | 9/2012 | Dinsmoor et al. |
| 8,271,094 B1 | 9/2012 | Moffitt et al. |
| 8,280,500 B2 | 10/2012 | Chow |
| 8,290,599 B2 | 10/2012 | Walter et al. |
| 8,303,511 B2 | 11/2012 | Eigler et al. |
| 8,328,751 B2 | 12/2012 | Keren et al. |
| 8,332,049 B2 | 12/2012 | Pianca et al. |
| 8,335,570 B2 | 12/2012 | Mcdonald |
| 8,340,782 B2 | 12/2012 | Mcdonald et al. |
| 8,348,996 B2 | 1/2013 | Tuval et al. |
| 8,352,035 B2 | 1/2013 | Schleicher et al. |
| 8,352,039 B2 | 1/2013 | Davis et al. |
| 8,359,107 B2 | 1/2013 | Pianca et al. |
| 8,364,279 B2 | 1/2013 | Mcdonald et al. |
| 8,374,686 B2 | 2/2013 | Ghanem et al. |
| 8,380,324 B2 | 2/2013 | Mcdonald et al. |
| 8,380,325 B2 | 2/2013 | Mcdonald |
| 8,386,038 B2 | 2/2013 | Bianchi et al. |
| 8,398,708 B2 | 3/2013 | Meiri et al. |
| 8,401,214 B2 | 3/2013 | Perkins et al. |
| 8,401,654 B1 | 3/2013 | Foster et al. |
| 8,406,893 B2 | 3/2013 | Krause et al. |
| 8,406,897 B2 | 3/2013 | Mcdonald et al. |
| 8,412,332 B2 | 4/2013 | Massoud-Ansari et al. |
| 8,412,349 B2 | 4/2013 | Barker |
| 8,417,343 B2 | 4/2013 | Bolea et al. |
| 8,433,409 B2 | 4/2013 | Johnson et al. |
| 8,437,851 B2 | 5/2013 | Corbucci et al. |
| 8,442,649 B2 | 5/2013 | Mcdonald |
| 8,452,407 B2 | 5/2013 | Whitehurst et al. |
| 8,460,366 B2 | 6/2013 | Rowe |
| 8,460,372 B2 | 6/2013 | McNamara et al. |
| 8,478,423 B2 | 7/2013 | Mcdonald et al. |
| 8,494,654 B2 | 7/2013 | Pianca et al. |
| 8,506,514 B2 | 8/2013 | Pedersen et al. |
| 8,515,541 B1 | 8/2013 | Jaax et al. |
| 8,527,045 B2 | 9/2013 | Krause et al. |
| 8,531,153 B2 | 9/2013 | Baarman et al. |
| 8,538,538 B2 | 9/2013 | Torgerson et al. |
| 8,543,210 B2 | 9/2013 | Sharma |
| 8,548,582 B2 | 10/2013 | Mcdonald et al. |
| 8,597,225 B2 | 12/2013 | Kapadia |
| 8,600,507 B2 | 12/2013 | Brase et al. |
| 8,600,512 B2 | 12/2013 | Whitehurst et al. |
| 8,600,518 B2 | 12/2013 | Meadows et al. |
| 8,606,355 B1 | 12/2013 | Krause |
| 8,626,297 B2 | 1/2014 | Jaax et al. |
| 8,638,062 B2 | 1/2014 | Baarman et al. |
| 8,647,381 B2 | 2/2014 | Essinger et al. |
| 8,655,451 B2 | 2/2014 | Klosterman et al. |
| 8,670,823 B2 | 3/2014 | Murtonen |
| 8,676,322 B2 | 3/2014 | Whitehurst et al. |
| 8,682,439 B2 | 3/2014 | Derohan et al. |
| 8,688,235 B1 | 4/2014 | Pianca et al. |
| 8,696,611 B2 | 4/2014 | Nitzan et al. |

(56) References Cited

U.S. PATENT DOCUMENTS

| | | |
|---|---|---|
| 8,712,542 B2 | 4/2014 | Mcmorrow et al. |
| 8,718,790 B2 | 5/2014 | Pianca |
| 8,740,962 B2 | 6/2014 | Finch et al. |
| 8,744,568 B2 | 6/2014 | Weber |
| 8,744,591 B2 | 6/2014 | Davis et al. |
| 8,745,845 B2 | 6/2014 | Finch et al. |
| 8,747,458 B2 | 6/2014 | Tuval et al. |
| 8,752,258 B2 | 6/2014 | Finch et al. |
| 8,755,881 B2 | 6/2014 | Kaiser et al. |
| 8,761,886 B2 | 6/2014 | Stancer et al. |
| 8,764,848 B2 | 7/2014 | Callaghan et al. |
| 8,768,488 B2 | 7/2014 | Barker |
| 8,774,941 B2 | 7/2014 | Pianca |
| 8,792,994 B2 | 7/2014 | Venancio |
| 8,805,537 B1 | 8/2014 | Cong et al. |
| 8,812,107 B2 | 8/2014 | Virag et al. |
| 8,818,483 B2 | 8/2014 | Romero |
| 8,818,505 B2 | 8/2014 | Bhunia et al. |
| 8,818,508 B2 | 8/2014 | Scheiner |
| 8,845,705 B2 | 9/2014 | Perkins et al. |
| 8,849,396 B2 | 9/2014 | Derohan et al. |
| 8,849,414 B2 | 9/2014 | Lee |
| 8,849,419 B2 | 9/2014 | Lee |
| 8,849,422 B2 | 9/2014 | Pianca |
| 8,868,207 B2 | 10/2014 | Mcdonald et al. |
| 8,874,206 B2 | 10/2014 | Malinowski et al. |
| 8,882,697 B2 | 11/2014 | Celermajer et al. |
| 8,897,876 B2 | 11/2014 | Sundaramurthy et al. |
| 8,909,352 B2 | 12/2014 | Venook et al. |
| 8,909,354 B2 | 12/2014 | Orinski |
| 8,914,112 B2 | 12/2014 | Whitehurst et al. |
| 8,923,970 B2 | 12/2014 | Bar-yoseph et al. |
| 8,936,630 B2 | 1/2015 | Denison et al. |
| 8,942,935 B2 | 1/2015 | Michaels et al. |
| 8,951,223 B2 | 2/2015 | McNamara et al. |
| 8,965,511 B2 | 2/2015 | Greiner et al. |
| 8,965,528 B2 | 2/2015 | Howard |
| 8,979,758 B2 | 3/2015 | Stein et al. |
| 9,005,155 B2 | 4/2015 | Sugimoto |
| 9,008,778 B2 | 4/2015 | Gupta et al. |
| 9,020,589 B2 | 4/2015 | Torgerson |
| 9,034,034 B2 | 5/2015 | Nitzan et al. |
| 9,056,206 B2 | 6/2015 | Torgerson et al. |
| 9,065,284 B2 | 6/2015 | Malpas et al. |
| 9,072,447 B2 | 7/2015 | Chow |
| 9,079,039 B2 | 7/2015 | Carlson et al. |
| 9,095,701 B2 | 8/2015 | Govea et al. |
| 9,101,755 B2 | 8/2015 | Pianca |
| 9,119,967 B2 | 9/2015 | Gupta et al. |
| 9,119,970 B2 | 9/2015 | Va |
| 9,132,276 B2 | 9/2015 | Meskens |
| 9,138,213 B2 | 9/2015 | Amin et al. |
| 9,143,003 B2 | 9/2015 | Baarman et al. |
| 9,162,048 B2 | 10/2015 | Romero et al. |
| 9,162,055 B2 | 10/2015 | Pianca et al. |
| 9,180,291 B2 | 11/2015 | Leven |
| 9,180,303 B2 | 11/2015 | Goetz |
| 9,192,772 B1 | 11/2015 | Tsukamoto et al. |
| 9,204,842 B2 | 12/2015 | Mothilal et al. |
| 9,205,236 B2 | 12/2015 | McNamara et al. |
| 9,205,251 B2 | 12/2015 | Govea et al. |
| 9,215,075 B1 | 12/2015 | Poltorak |
| 9,216,282 B1 | 12/2015 | Moffitt et al. |
| 9,216,563 B2 | 12/2015 | Barner |
| 9,232,997 B2 | 1/2016 | Sugimoto et al. |
| 9,259,571 B2 | 2/2016 | Straka et al. |
| 9,265,934 B2 | 2/2016 | Pianca et al. |
| 9,277,995 B2 | 3/2016 | Celermajer et al. |
| 9,283,378 B2 | 3/2016 | Govea |
| 9,289,592 B2 | 3/2016 | Chinn et al. |
| 9,289,600 B2 | 3/2016 | Govea et al. |
| 9,302,094 B2 | 4/2016 | Govea |
| 9,302,113 B2 | 4/2016 | Ranu et al. |
| 9,320,891 B2 | 4/2016 | Anderson et al. |
| 9,320,901 B2 | 4/2016 | Torgerson et al. |
| 9,339,657 B2 | 5/2016 | Stancer et al. |
| 9,345,897 B2 | 5/2016 | Dorman et al. |
| 9,352,145 B2 | 5/2016 | Whitehurst et al. |
| 9,358,371 B2 | 6/2016 | McNamara et al. |
| 9,364,658 B2 | 6/2016 | Wechter |
| 9,381,342 B2 | 7/2016 | Barker |
| 9,393,422 B2 | 7/2016 | Moffitt et al. |
| 9,399,131 B2 | 7/2016 | Digiore et al. |
| 9,402,993 B2 | 8/2016 | Howard et al. |
| 9,403,011 B2 | 8/2016 | Mercanzini |
| 9,409,032 B2 | 8/2016 | Brase et al. |
| 9,415,154 B2 | 8/2016 | Leven |
| 9,415,212 B2 | 8/2016 | Barker |
| 9,415,213 B2 | 8/2016 | Venook et al. |
| 9,440,066 B2 | 9/2016 | Black |
| 9,456,812 B2 | 10/2016 | Finch et al. |
| 9,492,655 B2 | 11/2016 | Pianca et al. |
| 9,498,635 B2 | 11/2016 | Dellamano et al. |
| 9,498,636 B2 | 11/2016 | Dellamano et al. |
| 9,504,839 B2 | 11/2016 | Leven |
| 9,504,842 B2 | 11/2016 | Guardiani et al. |
| 9,517,334 B2 | 12/2016 | Barner et al. |
| 9,533,141 B2 | 1/2017 | Black et al. |
| 9,537,344 B2 | 1/2017 | Thompson et al. |
| 9,539,432 B2 | 1/2017 | Dellamano et al. |
| 9,544,068 B2 | 1/2017 | Arbabian et al. |
| 9,560,980 B2 | 2/2017 | Charlton et al. |
| 9,561,362 B2 | 2/2017 | Malinowski |
| 9,597,505 B2 | 3/2017 | Donofrio et al. |
| 9,604,048 B2 | 3/2017 | Govea |
| 9,604,050 B2 | 3/2017 | Barker |
| 9,604,066 B2 | 3/2017 | Carbunaru et al. |
| 9,604,068 B2 | 3/2017 | Malinowski |
| 9,610,041 B2 | 4/2017 | Foster et al. |
| 9,610,434 B2 | 4/2017 | Barker |
| 9,629,658 B2 | 4/2017 | Barker |
| 9,629,715 B2 | 4/2017 | Nitzan et al. |
| 9,642,993 B2 | 5/2017 | McNamara et al. |
| 9,643,010 B2 | 5/2017 | Ranu |
| 9,647,462 B2 | 5/2017 | Angst et al. |
| 9,649,480 B2 | 5/2017 | Sugimoto et al. |
| 9,649,489 B2 | 5/2017 | Wechter et al. |
| 9,655,528 B2 | 5/2017 | Zhu |
| 9,656,093 B2 | 5/2017 | Villarta et al. |
| 9,662,506 B2 | 5/2017 | Govea |
| 9,669,210 B2 | 6/2017 | Barker et al. |
| 9,681,948 B2 | 6/2017 | Levi et al. |
| 9,700,350 B2 | 7/2017 | Barker |
| 9,707,382 B2 | 7/2017 | Nitzan et al. |
| 9,707,406 B1 | 7/2017 | Dellamano et al. |
| 9,713,696 B2 | 7/2017 | Yacoby et al. |
| 9,713,725 B2 | 7/2017 | Bobgan et al. |
| 9,724,499 B2 | 8/2017 | Rottenberg et al. |
| 9,744,368 B2 | 8/2017 | Dinsmoor |
| 9,757,107 B2 | 9/2017 | McNamara et al. |
| 9,770,598 B2 | 9/2017 | Malinowski et al. |
| 9,775,636 B2 | 10/2017 | Fazio et al. |
| 9,775,987 B2 | 10/2017 | Donofrio et al. |
| 9,782,581 B2 | 10/2017 | Howard et al. |
| 9,782,582 B2 | 10/2017 | Govea et al. |
| 9,782,597 B2 | 10/2017 | Shanahan et al. |
| 9,808,613 B2 | 11/2017 | Mcdonald et al. |
| 9,814,881 B2 | 11/2017 | Moffitt |
| 9,826,963 B2 | 11/2017 | Scott et al. |
| 9,833,611 B2 | 12/2017 | Govea et al. |
| 9,833,615 B2 | 12/2017 | Pereira et al. |
| 9,833,622 B2 | 12/2017 | Moffitt et al. |
| 9,833,629 B2 | 12/2017 | Dellamano et al. |
| 9,839,788 B2 | 12/2017 | Dellamano et al. |
| 9,849,025 B2 | 12/2017 | Zaveri et al. |
| 9,867,981 B2 | 1/2018 | Black et al. |
| 9,878,148 B2 | 1/2018 | Leven et al. |
| 9,883,836 B2 | 2/2018 | Cahan et al. |
| 9,889,304 B2 | 2/2018 | Mercanzini |
| 9,889,308 B2 | 2/2018 | Dellamano et al. |
| 9,901,737 B2 | 2/2018 | Moffitt et al. |
| 9,907,972 B2 | 3/2018 | Kameli |
| 9,918,856 B2 | 3/2018 | Favier et al. |
| 9,919,148 B2 | 3/2018 | Howard et al. |

(56) References Cited

U.S. PATENT DOCUMENTS

| | | |
|---|---|---|
| 9,925,377 B2 | 3/2018 | Moffitt et al. |
| 9,925,378 B2 | 3/2018 | Moffitt et al. |
| 9,931,109 B2 | 4/2018 | Burckhardt et al. |
| 9,937,036 B2 | 4/2018 | Sugimoto et al. |
| 9,943,670 B2 | 4/2018 | Keren et al. |
| 9,956,000 B2 | 5/2018 | Gardanier et al. |
| 9,956,394 B2 | 5/2018 | Howard et al. |
| 9,974,959 B2 | 5/2018 | Moffitt et al. |
| 9,980,815 B2 | 5/2018 | Nitzan et al. |
| 9,986,989 B2 | 6/2018 | Roche et al. |
| 9,987,482 B2 | 6/2018 | Nageri et al. |
| 9,987,493 B2 | 6/2018 | Torgerson et al. |
| 9,993,168 B2 | 6/2018 | Huang et al. |
| 10,022,054 B2 | 7/2018 | Najafi et al. |
| 10,022,542 B2 | 7/2018 | Yip et al. |
| 10,022,549 B2 | 7/2018 | Dellamano et al. |
| 10,027,179 B1 | 7/2018 | Bello et al. |
| 10,035,013 B2 | 7/2018 | Desalles et al. |
| 10,045,766 B2 | 8/2018 | McNamara et al. |
| 10,058,696 B2 | 8/2018 | Stouffer |
| 10,075,026 B2 | 9/2018 | Badr et al. |
| 10,076,403 B1 | 9/2018 | Eigler et al. |
| 10,076,408 B2 | 9/2018 | Basinger et al. |
| 10,117,580 B1 | 11/2018 | Puryear et al. |
| 10,117,740 B1 | 11/2018 | Lee |
| 10,130,806 B2 | 11/2018 | Leven et al. |
| 10,137,304 B2 | 11/2018 | Kallmyer |
| 10,147,248 B2 | 12/2018 | Graafstra |
| 10,173,055 B2 | 1/2019 | Howard et al. |
| 10,176,933 B2 | 1/2019 | Irazoqui et al. |
| 10,179,234 B2 | 1/2019 | Leven |
| 10,179,237 B2 | 1/2019 | Kane et al. |
| 10,188,375 B2 | 1/2019 | McNamara et al. |
| 10,201,686 B2 | 2/2019 | Saul et al. |
| 10,204,706 B2 | 2/2019 | Davis et al. |
| 10,207,087 B2 | 2/2019 | Keren |
| 10,226,616 B2 | 3/2019 | Barker |
| 10,232,169 B2 | 3/2019 | Govea et al. |
| 10,251,676 B2 | 4/2019 | Brunner et al. |
| 10,251,740 B2 | 4/2019 | Eigler et al. |
| 10,286,205 B2 | 5/2019 | Steinke et al. |
| 10,286,215 B2 | 5/2019 | Perkins et al. |
| 10,292,690 B2 | 5/2019 | Celermajer et al. |
| 10,307,602 B2 | 6/2019 | Leven |
| 10,335,607 B2 | 7/2019 | Orinski |
| 10,342,983 B2 | 7/2019 | Nageri et al. |
| 10,350,384 B2 | 7/2019 | Farnan et al. |
| 10,357,357 B2 | 7/2019 | Levi et al. |
| 10,368,981 B2 | 8/2019 | Nitzan et al. |
| 10,376,359 B2 | 8/2019 | Essinger et al. |
| 10,376,680 B2 | 8/2019 | McNamara et al. |
| 10,391,319 B2 | 8/2019 | Shuros et al. |
| 10,398,421 B2 | 9/2019 | Celermajer |
| 10,398,899 B2 | 9/2019 | Torgerson |
| 10,405,903 B1 | 9/2019 | Biesinger et al. |
| 10,413,284 B2 | 9/2019 | McNamara et al. |
| 10,413,286 B2 | 9/2019 | McNamara et al. |
| 10,413,737 B2 | 9/2019 | Bokil et al. |
| 10,413,739 B2 | 9/2019 | Funderburk |
| 10,426,968 B2 | 10/2019 | Casse et al. |
| 10,449,382 B2 | 10/2019 | Casse et al. |
| 10,463,305 B2 | 11/2019 | An et al. |
| 10,463,477 B2 | 11/2019 | Forcucci et al. |
| 10,463,490 B2 | 11/2019 | Rottenberg et al. |
| 10,471,251 B1 | 11/2019 | Manicka |
| 10,478,594 B2 | 11/2019 | Yacoby et al. |
| 10,512,784 B2 | 12/2019 | Hahn et al. |
| 10,554,069 B2 | 2/2020 | Paralikar et al. |
| 10,568,751 B2 | 2/2020 | McNamara |
| 10,576,267 B2 | 3/2020 | Reddy et al. |
| 10,576,269 B2 | 3/2020 | Steinke et al. |
| 10,583,247 B2 | 3/2020 | Mandro |
| 10,588,611 B2 | 3/2020 | Magnin et al. |
| 10,603,485 B2 | 3/2020 | Nageri |
| 10,603,499 B2 | 3/2020 | Lopez |
| 10,603,505 B2 | 3/2020 | Casse et al. |
| 10,610,210 B2 | 4/2020 | Finch et al. |
| 10,610,694 B2 | 4/2020 | Reinke et al. |
| 10,624,621 B2 | 4/2020 | Celermajer |
| 10,625,072 B2 | 4/2020 | Serran |
| 10,632,292 B2 | 4/2020 | Forcucci et al. |
| 10,638,955 B2 | 5/2020 | Rowland et al. |
| 10,639,459 B2 | 5/2020 | Nitzan et al. |
| 10,639,486 B2 | 5/2020 | Linder et al. |
| 10,655,024 B2 | 5/2020 | Yadavalli et al. |
| 10,667,896 B2 | 6/2020 | Delaney, Jr. et al. |
| 10,667,904 B2 | 6/2020 | Marquez et al. |
| 10,668,294 B2 | 6/2020 | Koop et al. |
| 10,675,450 B2 | 6/2020 | Finch |
| 10,675,476 B2 | 6/2020 | Reddy et al. |
| 10,695,571 B2 | 6/2020 | Dellamano et al. |
| 10,709,886 B2 | 7/2020 | Nagaoka et al. |
| 10,709,888 B2 | 7/2020 | Pianca |
| 10,716,935 B2 | 7/2020 | Leven et al. |
| 10,751,542 B2 | 8/2020 | Demmer et al. |
| 10,772,557 B2 | 9/2020 | Windolf |
| 10,780,278 B2 | 9/2020 | Hahn et al. |
| 10,806,352 B2 | 10/2020 | Sweeney et al. |
| 10,813,744 B2 | 10/2020 | Gupta et al. |
| 10,820,987 B2 | 11/2020 | Basinger et al. |
| 10,821,286 B2 | 11/2020 | Acklin et al. |
| 10,828,151 B2 | 11/2020 | Nitzan et al. |
| 10,835,394 B2 | 11/2020 | Nae et al. |
| 10,835,757 B2 | 11/2020 | Register et al. |
| 10,849,522 B2 | 12/2020 | Eddy et al. |
| 10,856,767 B2 | 12/2020 | Dettmann et al. |
| 10,870,008 B2 | 12/2020 | Hahn et al. |
| 10,881,863 B2 | 1/2021 | Maile et al. |
| 10,881,869 B2 | 1/2021 | Maile et al. |
| 10,894,163 B2 | 1/2021 | Stahmann |
| 10,898,698 B1 | 1/2021 | Eigler et al. |
| 10,898,719 B2 | 1/2021 | Pivonka et al. |
| 10,910,863 B2 | 2/2021 | Otten |
| 10,912,645 B2 | 2/2021 | Rottenberg et al. |
| 10,918,476 B2 | 2/2021 | Otts |
| 10,918,873 B2 | 2/2021 | Funderburk |
| 10,918,875 B2 | 2/2021 | Maile et al. |
| 10,925,706 B2 | 2/2021 | Eigler et al. |
| 10,932,786 B2 | 3/2021 | McNamara et al. |
| 10,933,234 B2 | 3/2021 | Molnar et al. |
| 10,940,296 B2 | 3/2021 | Keren |
| 10,945,716 B2 | 3/2021 | Chen et al. |
| 10,960,214 B2 | 3/2021 | Steinke et al. |
| 10,967,192 B2 | 4/2021 | Lui et al. |
| 10,973,425 B2 | 4/2021 | Cao |
| 11,002,990 B2 | 5/2021 | Lee et al. |
| 11,020,592 B2 | 6/2021 | Tyulmankov et al. |
| 11,020,595 B2 | 6/2021 | Koop |
| 11,045,658 B2 | 6/2021 | Iyer et al. |
| 11,050,263 B2 | 6/2021 | Bae et al. |
| 11,052,259 B2 | 7/2021 | Stinauer et al. |
| 11,056,267 B2 | 7/2021 | Iyer et al. |
| 11,090,491 B2 | 8/2021 | Mishra et al. |
| 11,097,096 B2 | 8/2021 | Linden et al. |
| 11,116,988 B2 | 9/2021 | Maile et al. |
| 11,135,410 B2 | 10/2021 | Finch et al. |
| 11,135,439 B2 | 10/2021 | Deshazo et al. |
| 11,147,979 B2 | 10/2021 | Linder et al. |
| 11,160,980 B2 | 11/2021 | Mishra et al. |
| 11,160,984 B2 | 11/2021 | Deshazo et al. |
| 11,167,128 B2 | 11/2021 | Villarta |
| 11,172,959 B2 | 11/2021 | Leven |
| 11,198,006 B1 | 12/2021 | Nijlunsing et al. |
| 11,207,532 B2 | 12/2021 | Eddy et al. |
| 11,224,743 B2 | 1/2022 | Govea et al. |
| 11,241,166 B1 | 2/2022 | Lee |
| 11,241,576 B2 | 2/2022 | Hansen et al. |
| 11,253,685 B2 | 2/2022 | Fahey et al. |
| 11,291,846 B2 | 4/2022 | Chiang |
| 11,311,373 B2 | 4/2022 | Gutierrez et al. |
| 11,331,493 B2 | 5/2022 | Pivonka et al. |
| 11,344,728 B2 | 5/2022 | Mercanzini et al. |
| 11,357,992 B2 | 6/2022 | Nageri et al. |
| 11,357,995 B2 | 6/2022 | Dellamano et al. |

(56) References Cited

U.S. PATENT DOCUMENTS

| | | |
|---|---|---|
| 11,364,109 B2 | 6/2022 | Basinger et al. |
| 11,369,267 B2 | 6/2022 | Melodia et al. |
| 11,383,083 B2 | 7/2022 | Bolea |
| 11,389,583 B2 | 7/2022 | Noshadi |
| 11,400,291 B2 | 8/2022 | Gnansia et al. |
| 11,426,595 B2 | 8/2022 | Leven et al. |
| 11,458,309 B2 | 10/2022 | Zorman et al. |
| 11,467,665 B2 | 10/2022 | Gribetz |
| 11,493,556 B2 | 11/2022 | Deshazo |
| 11,497,914 B2 | 11/2022 | Hahn et al. |
| 11,504,526 B2 | 11/2022 | Zhu |
| 11,511,121 B2 | 11/2022 | Sit et al. |
| 11,524,174 B2 | 12/2022 | Vansickle et al. |
| 11,529,510 B2 | 12/2022 | Leven |
| 11,565,131 B2 | 1/2023 | Vansickle et al. |
| 11,577,075 B1 | 2/2023 | Gaudiani |
| 11,583,387 B2 | 2/2023 | Boysset et al. |
| 11,607,163 B2 | 3/2023 | Iyer et al. |
| 11,622,695 B1 | 4/2023 | Andriola et al. |
| 11,623,095 B2 | 4/2023 | Esteller et al. |
| 11,633,194 B2 | 4/2023 | Alexander et al. |
| 11,642,065 B2 | 5/2023 | Felix et al. |
| 11,679,263 B2 | 6/2023 | Hsu et al. |
| 11,696,681 B2 | 7/2023 | Felix et al. |
| 11,697,019 B2 | 7/2023 | Mazanec |
| 11,701,019 B2 | 7/2023 | Gunn et al. |
| 11,717,695 B2 | 8/2023 | Keil |
| 11,737,667 B2 | 8/2023 | Fink et al. |
| 11,737,896 B2 | 8/2023 | Bhamra et al. |
| 11,745,023 B2 | 9/2023 | Keil et al. |
| 11,791,657 B2 | 10/2023 | Rotfogel et al. |
| 11,801,369 B2 | 10/2023 | Fahey et al. |
| 11,806,547 B2 | 11/2023 | Howard |
| 2002/0072656 A1 | 6/2002 | Vantassel et al. |
| 2002/0151770 A1 | 10/2002 | Noll et al. |
| 2002/0161427 A1 | 10/2002 | Rabkin et al. |
| 2002/0169371 A1 | 11/2002 | Gilderdale |
| 2002/0169475 A1 | 11/2002 | Gainor et al. |
| 2002/0177891 A1 | 11/2002 | Miles et al. |
| 2003/0125798 A1 | 7/2003 | Martin |
| 2003/0127090 A1 | 7/2003 | Gifford et al. |
| 2003/0163190 A1 | 8/2003 | LaFont et al. |
| 2003/0204222 A1 | 10/2003 | Leinders et al. |
| 2003/0208244 A1 | 11/2003 | Stein et al. |
| 2004/0016514 A1 | 1/2004 | Nien |
| 2004/0077988 A1 | 4/2004 | Tweden et al. |
| 2004/0088045 A1 | 5/2004 | Cox |
| 2004/0093075 A1 | 5/2004 | Kuehne |
| 2004/0106954 A1 | 6/2004 | Whitehurst et al. |
| 2004/0122477 A1 | 6/2004 | Whitehurst et al. |
| 2004/0143294 A1 | 7/2004 | Corcoran et al. |
| 2004/0147869 A1 | 7/2004 | Wolf et al. |
| 2004/0158143 A1 | 8/2004 | Flaherty et al. |
| 2004/0162514 A1 | 8/2004 | Alferness et al. |
| 2004/0162590 A1 | 8/2004 | Mcclure et al. |
| 2004/0186566 A1 | 9/2004 | Hindrichs et al. |
| 2004/0210190 A1 | 10/2004 | Kohler et al. |
| 2004/0215067 A1 | 10/2004 | Stiger et al. |
| 2004/0215323 A1 | 10/2004 | Stiger |
| 2005/0004641 A1 | 1/2005 | Pappu |
| 2005/0027332 A1 | 2/2005 | Avrahami et al. |
| 2005/0033351 A1 | 2/2005 | Newton |
| 2005/0060030 A1 | 3/2005 | Lashinski et al. |
| 2005/0101946 A1 | 5/2005 | Govari et al. |
| 2005/0134452 A1 | 6/2005 | Smith |
| 2005/0148925 A1 | 7/2005 | Rottenberg et al. |
| 2005/0159789 A1 | 7/2005 | Brockway et al. |
| 2005/0165344 A1 | 7/2005 | Dobak, III |
| 2005/0192627 A1 | 9/2005 | Whisenant et al. |
| 2005/0204811 A1 | 9/2005 | Neff |
| 2005/0288722 A1 | 12/2005 | Eigler et al. |
| 2006/0009810 A1 | 1/2006 | Mann et al. |
| 2006/0025857 A1 | 2/2006 | Bergheim et al. |
| 2006/0047205 A1 | 3/2006 | Ludomirsky et al. |
| 2006/0064135 A1 | 3/2006 | Brockway |
| 2006/0111660 A1 | 5/2006 | Wolf et al. |
| 2006/0116625 A1 | 6/2006 | Renati et al. |
| 2006/0167522 A1 | 7/2006 | Malinowski |
| 2006/0200030 A1 | 9/2006 | White et al. |
| 2006/0241717 A1 | 10/2006 | Mcgivern et al. |
| 2007/0010837 A1 | 1/2007 | Tanaka |
| 2007/0010852 A1 | 1/2007 | Blaeser et al. |
| 2007/0043435 A1 | 2/2007 | Seguin et al. |
| 2007/0050030 A1 | 3/2007 | Kim |
| 2007/0088220 A1 | 4/2007 | Stahmann |
| 2007/0088223 A1 | 4/2007 | Mann et al. |
| 2007/0118039 A1 | 5/2007 | Bodecker et al. |
| 2007/0142872 A1 | 6/2007 | Hackworth et al. |
| 2007/0150019 A1 | 6/2007 | Youker et al. |
| 2007/0213813 A1 | 9/2007 | Von Segesser et al. |
| 2007/0282157 A1 | 12/2007 | Rottenberg et al. |
| 2007/0293904 A1 | 12/2007 | Gelbart et al. |
| 2008/0027513 A1 | 1/2008 | Carbunaru |
| 2008/0033527 A1 | 2/2008 | Nunez et al. |
| 2008/0077184 A1 | 3/2008 | Denker et al. |
| 2008/0097276 A1 | 4/2008 | Bertrand et al. |
| 2008/0108904 A1 | 5/2008 | Heil |
| 2008/0119891 A1 | 5/2008 | Miles et al. |
| 2008/0127689 A1 | 6/2008 | McCusker et al. |
| 2008/0171941 A1 | 7/2008 | Huelskamp et al. |
| 2008/0208083 A1 | 8/2008 | Lin et al. |
| 2008/0212261 A1 | 9/2008 | Ajayan et al. |
| 2008/0262566 A1 | 10/2008 | Jaax |
| 2008/0288019 A1 | 11/2008 | Heller |
| 2009/0005756 A1 | 1/2009 | Foster |
| 2009/0025459 A1 | 1/2009 | Zhang et al. |
| 2009/0036975 A1 | 2/2009 | Ward et al. |
| 2009/0105782 A1 | 4/2009 | Mickle et al. |
| 2009/0118779 A1 | 5/2009 | Najafi et al. |
| 2009/0132009 A1 | 5/2009 | Torgerson |
| 2009/0243956 A1 | 10/2009 | Keilman et al. |
| 2009/0248122 A1 | 10/2009 | Pianca |
| 2009/0248124 A1 | 10/2009 | Chinn et al. |
| 2009/0270742 A1 | 10/2009 | Wolinsky et al. |
| 2009/0275996 A1 | 11/2009 | Burnes et al. |
| 2009/0276040 A1 | 11/2009 | Rowe et al. |
| 2009/0281597 A1 | 11/2009 | Parramon et al. |
| 2010/0010565 A1 | 1/2010 | Gelbart et al. |
| 2010/0023103 A1 | 1/2010 | Elborno |
| 2010/0063375 A1 | 3/2010 | Kassab et al. |
| 2010/0076366 A1 | 3/2010 | Henderson, Sr. et al. |
| 2010/0076517 A1 | 3/2010 | Imran |
| 2010/0076535 A1 | 3/2010 | Pianca et al. |
| 2010/0106028 A1 | 4/2010 | Penner et al. |
| 2010/0114195 A1 | 5/2010 | Burnes et al. |
| 2010/0114235 A1 | 5/2010 | Jiang et al. |
| 2010/0114244 A1 | 5/2010 | Manda et al. |
| 2010/0168672 A1 | 7/2010 | Carr |
| 2010/0179449 A1 | 7/2010 | Chow et al. |
| 2010/0198308 A1 | 8/2010 | Zhou et al. |
| 2010/0241195 A1 | 9/2010 | Meadows et al. |
| 2010/0241241 A1 | 9/2010 | Mcknight et al. |
| 2010/0249560 A1 | 9/2010 | Levinson et al. |
| 2010/0256696 A1 | 10/2010 | Schleicher et al. |
| 2010/0262021 A1 | 10/2010 | Yadav et al. |
| 2010/0262036 A1 | 10/2010 | Najafi et al. |
| 2010/0275592 A1 | 11/2010 | Topliss et al. |
| 2010/0280568 A1 | 11/2010 | Bulkes et al. |
| 2010/0298930 A1 | 11/2010 | Orlov |
| 2010/0331918 A1 | 12/2010 | Digiore et al. |
| 2010/0331919 A1 | 12/2010 | Baldwin et al. |
| 2011/0009736 A1 | 1/2011 | Maltz et al. |
| 2011/0009933 A1 | 1/2011 | Barker |
| 2011/0034970 A1 | 2/2011 | Barker |
| 2011/0054515 A1 | 3/2011 | Bridgeman et al. |
| 2011/0082377 A1 | 4/2011 | Ah |
| 2011/0093042 A1 | 4/2011 | Torgerson et al. |
| 2011/0106220 A1 | 5/2011 | Degiorgio et al. |
| 2011/0218480 A1 | 9/2011 | Rottenberg et al. |
| 2011/0218481 A1 | 9/2011 | Rottenberg et al. |
| 2011/0218549 A1 | 9/2011 | Barker |
| 2011/0224681 A1 | 9/2011 | Mcdonald |
| 2011/0230893 A1 | 9/2011 | Barker |
| 2011/0257723 A1 | 10/2011 | McNamara |

(56) References Cited

U.S. PATENT DOCUMENTS

| | | |
|---|---|---|
| 2011/0264194 A1 | 10/2011 | Griswold |
| 2011/0282217 A1 | 11/2011 | Nashet |
| 2011/0295183 A1 | 12/2011 | Finch et al. |
| 2011/0301479 A1 | 12/2011 | Ghanem et al. |
| 2012/0041287 A1 | 2/2012 | Goodall et al. |
| 2012/0046710 A1 | 2/2012 | Digiore et al. |
| 2012/0059431 A1 | 3/2012 | Williams et al. |
| 2012/0078320 A1 | 3/2012 | Schotzko et al. |
| 2012/0109243 A1 | 5/2012 | Hettrick et al. |
| 2012/0109261 A1 | 5/2012 | Stancer et al. |
| 2012/0123496 A1 | 5/2012 | Schotzko et al. |
| 2012/0191153 A1 | 7/2012 | Swerdlow et al. |
| 2012/0215295 A1 | 8/2012 | Pianca |
| 2012/0229272 A1 | 9/2012 | Jacob et al. |
| 2012/0235502 A1 | 9/2012 | Kesler et al. |
| 2012/0253261 A1 | 10/2012 | Poletto et al. |
| 2012/0265296 A1 | 10/2012 | McNamara et al. |
| 2012/0283773 A1 | 11/2012 | Van Tassel et al. |
| 2012/0290062 A1 | 11/2012 | McNamara et al. |
| 2012/0316610 A1 | 12/2012 | Pianca et al. |
| 2013/0085350 A1 | 4/2013 | Schugt et al. |
| 2013/0123569 A1 | 5/2013 | Gross |
| 2013/0144379 A1 | 6/2013 | Najafi et al. |
| 2013/0178783 A1 | 7/2013 | Mcnamara et al. |
| 2013/0178784 A1 | 7/2013 | McNamara et al. |
| 2013/0190799 A1 | 7/2013 | Clark |
| 2013/0192611 A1 | 8/2013 | Taepke, II et al. |
| 2013/0197336 A1 | 8/2013 | Flo et al. |
| 2013/0197423 A1 | 8/2013 | Keren et al. |
| 2013/0211221 A1 | 8/2013 | Sunnarborg et al. |
| 2013/0226266 A1 | 8/2013 | Murtonen et al. |
| 2013/0253343 A1 | 9/2013 | Waldhauser et al. |
| 2013/0261531 A1 | 10/2013 | Gallagher et al. |
| 2013/0282091 A1 | 10/2013 | Leven |
| 2013/0293025 A1 | 11/2013 | Xu et al. |
| 2013/0317587 A1 | 11/2013 | Barker |
| 2014/0012342 A1 | 1/2014 | Penner et al. |
| 2014/0018885 A1 | 1/2014 | Pianca |
| 2014/0028109 A1 | 1/2014 | Simon et al. |
| 2014/0039586 A1 | 2/2014 | Barker et al. |
| 2014/0046427 A1 | 2/2014 | Michalak |
| 2014/0081154 A1 | 3/2014 | Toth |
| 2014/0128795 A1 | 5/2014 | Karen et al. |
| 2014/0128796 A1 | 5/2014 | Keren et al. |
| 2014/0135647 A1 | 5/2014 | Wolf, II |
| 2014/0163449 A1 | 6/2014 | Rottenberg et al. |
| 2014/0172057 A1 | 6/2014 | Orinski |
| 2014/0180371 A1 | 6/2014 | Leven |
| 2014/0213915 A1 | 7/2014 | Doan et al. |
| 2014/0213959 A1 | 7/2014 | Nitzan et al. |
| 2014/0222040 A1 | 8/2014 | Park et al. |
| 2014/0277054 A1 | 9/2014 | McNamara et al. |
| 2014/0306807 A1 | 10/2014 | Rowland et al. |
| 2014/0324138 A1 | 10/2014 | Wentz et al. |
| 2014/0330256 A1 | 11/2014 | Hyde et al. |
| 2014/0343645 A1 | 11/2014 | Wechter |
| 2014/0343646 A1 | 11/2014 | Leven |
| 2015/0005856 A1 | 1/2015 | Pianca et al. |
| 2015/0005860 A1 | 1/2015 | Howard et al. |
| 2015/0018913 A1 | 1/2015 | Leven |
| 2015/0018917 A1 | 1/2015 | Wechter et al. |
| 2015/0034217 A1 | 2/2015 | Vad |
| 2015/0045865 A1 | 2/2015 | Nageri et al. |
| 2015/0051677 A1 | 2/2015 | Marnfeldt |
| 2015/0051681 A1 | 2/2015 | Hershey |
| 2015/0084585 A1 | 3/2015 | Moran |
| 2015/0119796 A1 | 4/2015 | Finch |
| 2015/0148731 A1 | 5/2015 | Mcnamara et al. |
| 2015/0157268 A1 | 6/2015 | Winshtein et al. |
| 2015/0200562 A1 | 7/2015 | Kilinc et al. |
| 2015/0208929 A1 | 7/2015 | Rowland et al. |
| 2015/0223707 A1 | 8/2015 | Ludoph et al. |
| 2015/0230843 A1 | 8/2015 | Palmer et al. |
| 2015/0231387 A1 | 8/2015 | Harding et al. |
| 2015/0287544 A1 | 10/2015 | Irazoqui et al. |
| 2015/0360037 A1 | 12/2015 | Hahn et al. |
| 2015/0360049 A1 | 12/2015 | Kaplitt et al. |
| 2015/0374978 A1 | 12/2015 | Howard et al. |
| 2016/0022423 A1 | 1/2016 | Mcnamara et al. |
| 2016/0022995 A1 | 1/2016 | Kothandaraman et al. |
| 2016/0023008 A1 | 1/2016 | Kothandaraman |
| 2016/0051828 A1 | 2/2016 | Stahler et al. |
| 2016/0082247 A1 | 3/2016 | Black et al. |
| 2016/0089079 A1 | 3/2016 | Stein |
| 2016/0151179 A1 | 6/2016 | Favier et al. |
| 2016/0158561 A1 | 6/2016 | Reddy |
| 2016/0220357 A1 | 8/2016 | Anand et al. |
| 2016/0235999 A1 | 8/2016 | Nuta et al. |
| 2016/0256693 A1 | 9/2016 | Parramon |
| 2016/0303301 A1 | 10/2016 | Bluvshtein et al. |
| 2016/0375237 A1 | 12/2016 | Hahn et al. |
| 2017/0014067 A1 | 1/2017 | Peppou et al. |
| 2017/0043077 A1 | 2/2017 | Tuseth et al. |
| 2017/0105635 A1 | 4/2017 | Cho et al. |
| 2017/0113026 A1 | 4/2017 | Finch |
| 2017/0143978 A1 | 5/2017 | Barker |
| 2017/0259078 A1 | 9/2017 | Howard |
| 2017/0281936 A1 | 10/2017 | Aghassian et al. |
| 2017/0312078 A1 | 11/2017 | Krivoruchko |
| 2017/0326369 A1 | 11/2017 | Koop et al. |
| 2017/0326375 A1 | 11/2017 | Mcdonald et al. |
| 2017/0340460 A1 | 11/2017 | Rosen et al. |
| 2018/0014828 A1 | 1/2018 | Fonte et al. |
| 2018/0021569 A1 | 1/2018 | Pianca |
| 2018/0078773 A1 | 3/2018 | Thakur et al. |
| 2018/0117341 A1 | 5/2018 | Kane et al. |
| 2018/0168463 A1 | 6/2018 | Morris et al. |
| 2018/0250014 A1 | 9/2018 | Melanson et al. |
| 2018/0256865 A1 | 9/2018 | Finch et al. |
| 2018/0262037 A1 | 9/2018 | Meskeus |
| 2018/0310839 A1 | 11/2018 | McCaffrey et al. |
| 2018/0369596 A1 | 12/2018 | Funderburk |
| 2018/0369606 A1 | 12/2018 | Zhang et al. |
| 2019/0000327 A1 | 1/2019 | Doan |
| 2019/0014993 A1 | 1/2019 | Kaiser |
| 2019/0015103 A1 | 1/2019 | Sharma |
| 2019/0019632 A1 | 1/2019 | Rusling et al. |
| 2019/0021861 A1 | 1/2019 | Finch |
| 2019/0038895 A1 | 2/2019 | Pianca et al. |
| 2019/0070421 A1 | 3/2019 | Chen |
| 2019/0104936 A1 | 4/2019 | Gunn et al. |
| 2019/0105503 A1 | 4/2019 | Leven |
| 2019/0150758 A1 | 5/2019 | Sailey et al. |
| 2019/0167197 A1 | 6/2019 | Abuuassar et al. |
| 2019/0173505 A1 | 6/2019 | Koyama |
| 2019/0175883 A1 | 6/2019 | Wessler et al. |
| 2019/0192864 A1 | 6/2019 | Koop et al. |
| 2019/0201695 A1 | 7/2019 | Hsu et al. |
| 2019/0209834 A1 | 7/2019 | Zhang et al. |
| 2019/0254814 A1 | 8/2019 | Nitzan et al. |
| 2019/0262118 A1 | 8/2019 | Eigler et al. |
| 2019/0269392 A1 | 9/2019 | Celermajer et al. |
| 2019/0269876 A1 | 9/2019 | Hsu et al. |
| 2019/0290924 A1 | 9/2019 | Funderburk |
| 2019/0298556 A1 | 10/2019 | Bohn et al. |
| 2019/0307459 A1 | 10/2019 | Celermajer et al. |
| 2019/0328513 A1 | 10/2019 | Levi et al. |
| 2019/0336135 A1 | 11/2019 | Inouye et al. |
| 2019/0336163 A1 | 11/2019 | McNamara et al. |
| 2019/0343480 A1 | 11/2019 | Shute et al. |
| 2019/0350519 A1 | 11/2019 | Bailey et al. |
| 2020/0008870 A1 | 1/2020 | Gruba et al. |
| 2020/0009374 A1 | 1/2020 | Howard et al. |
| 2020/0023189 A1 | 1/2020 | Gribetz et al. |
| 2020/0060825 A1 | 2/2020 | Rottenberg et al. |
| 2020/0078196 A1 | 3/2020 | Rosen et al. |
| 2020/0078558 A1 | 3/2020 | Yacoby et al. |
| 2020/0085600 A1 | 3/2020 | Schwartz et al. |
| 2020/0188143 A1 | 6/2020 | McNamara |
| 2020/0196867 A1 | 6/2020 | Andersen et al. |
| 2020/0196876 A1 | 6/2020 | Minor et al. |
| 2020/0197178 A1 | 6/2020 | Vecchio |
| 2020/0229977 A1 | 7/2020 | Mixter et al. |
| 2020/0229981 A1 | 7/2020 | Mixter et al. |

(56) References Cited

U.S. PATENT DOCUMENTS

| | | |
|---|---|---|
| 2020/0229982 A1 | 7/2020 | Mixter et al. |
| 2020/0245991 A1 | 8/2020 | Celermajer |
| 2020/0253615 A1 | 8/2020 | Melanson et al. |
| 2020/0260991 A1 | 8/2020 | Rowlaud et al. |
| 2020/0261705 A1 | 8/2020 | Nitzan et al. |
| 2020/0268515 A1 | 8/2020 | Vettukattil et al. |
| 2020/0269047 A1 | 8/2020 | Mazanec et al. |
| 2020/0315599 A1 | 10/2020 | Nae et al. |
| 2020/0330749 A1 | 10/2020 | Gribetz et al. |
| 2020/0368505 A1 | 11/2020 | Nae et al. |
| 2020/0376262 A1 | 12/2020 | Clark et al. |
| 2021/0007610 A1 | 1/2021 | Hendriks et al. |
| 2021/0008389 A1 | 1/2021 | Featherstone et al. |
| 2021/0023374 A1 | 1/2021 | Block et al. |
| 2021/0030273 A1 | 2/2021 | Huang et al. |
| 2021/0038230 A1 | 2/2021 | Larsen et al. |
| 2021/0046219 A1 | 2/2021 | Hendriks et al. |
| 2021/0052378 A1 | 2/2021 | Nitzan et al. |
| 2021/0059527 A1 | 3/2021 | Najafi |
| 2021/0085935 A1 | 3/2021 | Fahey et al. |
| 2021/0100513 A1 | 4/2021 | Sahmauyar et al. |
| 2021/0100665 A1 | 4/2021 | Nae et al. |
| 2021/0106281 A1 | 4/2021 | Tran |
| 2021/0121179 A1 | 4/2021 | Ben-david et al. |
| 2021/0121697 A1 | 4/2021 | Linde et al. |
| 2021/0145331 A1 | 5/2021 | Simpson et al. |
| 2021/0153776 A1 | 5/2021 | Minar et al. |
| 2021/0177508 A1 | 6/2021 | Kellerman |
| 2021/0205590 A1 | 7/2021 | Fahey et al. |
| 2021/0212638 A1 | 7/2021 | Golda et al. |
| 2021/0252251 A1 | 8/2021 | Subramanian |
| 2021/0257849 A1 | 8/2021 | Keil et al. |
| 2021/0259732 A1 | 8/2021 | Dicicco et al. |
| 2021/0259829 A1 | 8/2021 | Quinn |
| 2021/0259839 A1 | 8/2021 | Cole et al. |
| 2021/0275805 A1 | 9/2021 | Boor et al. |
| 2021/0288527 A1 | 9/2021 | Bae et al. |
| 2021/0290214 A1 | 9/2021 | Cole et al. |
| 2021/0298763 A1 | 9/2021 | Stahmann et al. |
| 2021/0299425 A1 | 9/2021 | Kume et al. |
| 2021/0299430 A1 | 9/2021 | Ratz et al. |
| 2021/0302751 A1 | 9/2021 | Brockman et al. |
| 2021/0353407 A1 | 11/2021 | Ma |
| 2021/0359550 A1 | 11/2021 | Budgett et al. |
| 2021/0361238 A1 | 11/2021 | Bak-Boychuk et al. |
| 2021/0361257 A1 | 11/2021 | Eimer et al. |
| 2021/0361948 A1 | 11/2021 | Leuthardt et al. |
| 2021/0370032 A1 | 12/2021 | Fahey et al. |
| 2021/0401418 A1 | 12/2021 | Dang et al. |
| 2022/0008014 A1 | 1/2022 | Rowe et al. |
| 2022/0039670 A1 | 2/2022 | Berrada et al. |
| 2022/0039671 A1 | 2/2022 | Fahey |
| 2022/0061679 A1 | 3/2022 | Adler et al. |
| 2022/0095992 A1 | 3/2022 | Guvenc et al. |
| 2022/0109402 A1 | 4/2022 | Gong et al. |
| 2022/0115187 A1 | 4/2022 | Kataky et al. |
| 2022/0117540 A1 | 4/2022 | Leuthardt et al. |
| 2022/0117555 A1 | 4/2022 | Zarbatauy et al. |
| 2022/0118228 A1 | 4/2022 | Fahey et al. |
| 2022/0118251 A1 | 4/2022 | Buddha et al. |
| 2022/0131424 A1 | 4/2022 | Charthad et al. |
| 2022/0141663 A1 | 5/2022 | Kothandaraman et al. |
| 2022/0142652 A1 | 5/2022 | Alexander et al. |
| 2022/0151618 A1 | 5/2022 | Eigler et al. |
| 2022/0160309 A1 | 5/2022 | Poltorak |
| 2022/0167861 A1 | 6/2022 | Stahmann |
| 2022/0167921 A1 | 6/2022 | Aljuri et al. |
| 2022/0167922 A1 | 6/2022 | Gross et al. |
| 2022/0176120 A1 | 6/2022 | Kulkarni et al. |
| 2022/0176133 A1 | 6/2022 | Buddha et al. |
| 2022/0184355 A1 | 6/2022 | Fahey et al. |
| 2022/0192677 A1 | 6/2022 | Wedul et al. |
| 2022/0192819 A1 | 6/2022 | Rodeheaver et al. |
| 2022/0202505 A1 | 6/2022 | Roche |
| 2022/0218355 A1 | 7/2022 | Wedul et al. |
| 2022/0218964 A1 | 7/2022 | Fahey et al. |
| 2022/0226000 A1 | 7/2022 | Alexander et al. |
| 2022/0226156 A1 | 7/2022 | Lee et al. |
| 2022/0226623 A1 | 7/2022 | Fahey et al. |
| 2022/0233872 A1 | 7/2022 | Perryman et al. |
| 2022/0240856 A1 | 8/2022 | Stahmann et al. |
| 2022/0252849 A1 | 8/2022 | Lee et al. |
| 2022/0265157 A1 | 8/2022 | Charthad et al. |
| 2022/0265280 A1 | 8/2022 | Chamorro et al. |
| 2022/0266000 A1 | 8/2022 | Moffitt |
| 2022/0288401 A1 | 9/2022 | Landherr et al. |
| 2022/0300434 A1 | 9/2022 | Esteller |
| 2022/0313426 A1 | 10/2022 | Gifford, III et al. |
| 2022/0323781 A1 | 10/2022 | Subramanian et al. |
| 2022/0339448 A1 | 10/2022 | Jayakumar et al. |
| 2022/0362560 A1 | 11/2022 | Feldman |
| 2022/0378303 A1 | 12/2022 | Melodia et al. |
| 2022/0387785 A1 | 12/2022 | Huynh et al. |
| 2022/0387799 A1 | 12/2022 | Feldman et al. |
| 2022/0387806 A1 | 12/2022 | Mccormick et al. |
| 2022/0407360 A1 | 12/2022 | Chiao et al. |
| 2022/0413612 A1 | 12/2022 | Gribetz |
| 2023/0010306 A1 | 1/2023 | Bashirullah et al. |
| 2023/0041857 A1 | 2/2023 | Prutchi |
| 2023/0056111 A1 | 2/2023 | Gururaj et al. |
| 2023/0056924 A1 | 2/2023 | Fox et al. |
| 2023/0062862 A1 | 3/2023 | Forsell |
| 2023/0065828 A1 | 3/2023 | Forsell |
| 2023/0067764 A1 | 3/2023 | Forsell |
| 2023/0075205 A1 | 3/2023 | Moran et al. |
| 2023/0084193 A1 | 3/2023 | Fahey et al. |
| 2023/0118243 A1 | 4/2023 | Fox et al. |
| 2023/0129883 A1 | 4/2023 | Andriola et al. |
| 2023/0181906 A1 | 6/2023 | Moore et al. |
| 2023/0198274 A1 | 6/2023 | Aghaeepour et al. |
| 2023/0201546 A1 | 6/2023 | Fahey et al. |
| 2023/0210374 A1 | 7/2023 | Charthad et al. |
| 2023/0211076 A1 | 7/2023 | Weber et al. |
| 2023/0218180 A1 | 7/2023 | Mujeeb-U-Rahman et al. |
| 2023/0226344 A1 | 7/2023 | Richardson |
| 2023/0233229 A1 | 7/2023 | Picard et al. |
| 2023/0233849 A1 | 7/2023 | Gorski et al. |
| 2023/0238835 A1 | 7/2023 | Bae et al. |
| 2023/0264014 A1 | 8/2023 | Corey et al. |
| 2023/0277854 A1 | 9/2023 | Gavia |
| 2023/0329634 A1 | 10/2023 | Zaman |
| 2023/0346538 A1 | 11/2023 | Adler et al. |
| 2023/0355994 A1 | 11/2023 | Forsell |
| 2023/0355995 A1 | 11/2023 | Forsell |
| 2023/0364433 A1 | 11/2023 | Forsell |
| 2023/0364434 A1 | 11/2023 | Forsell |
| 2023/0371953 A1 | 11/2023 | Pantages et al. |
| 2023/0372683 A1 | 11/2023 | Andriola et al. |
| 2023/0405290 A1 | 12/2023 | Adriola et al. |

FOREIGN PATENT DOCUMENTS

| | | |
|---|---|---|
| AU | 2011332324 | 6/2013 |
| AU | 2012214279 | 8/2013 |
| AU | 2018228451 | 9/2019 |
| CA | 2785041 | 8/2011 |
| CA | 2786575 | 8/2011 |
| CA | 2818417 | 5/2012 |
| CA | 2955389 | 1/2016 |
| CA | 3054891 | 9/2018 |
| CN | 101415452 | 4/2009 |
| CN | 102458316 | 5/2012 |
| CN | 102905626 | 1/2013 |
| CN | 103458832 | 12/2013 |
| CN | 105662653 | 6/2016 |
| CN | 109646063 A | 4/2019 |
| CN | 110536657 | 12/2019 |
| EP | 1583585 | 10/2005 |
| EP | 1112044 | 1/2007 |
| EP | 2022532 | 2/2009 |
| EP | 2082708 | 7/2009 |
| EP | 2097012 | 9/2009 |
| EP | 2277586 | 1/2011 |
| EP | 2528646 | 12/2012 |

(56) References Cited

FOREIGN PATENT DOCUMENTS

| | | |
|---|---|---|
| EP | 2630811 | 8/2013 |
| EP | 2642954 | 10/2013 |
| EP | 2967867 | 1/2016 |
| EP | 3087953 | 11/2016 |
| EP | 3185948 | 7/2017 |
| EP | 3291773 | 3/2018 |
| EP | 3329860 | 6/2018 |
| EP | 3347085 | 7/2018 |
| EP | 3400053 | 11/2018 |
| EP | 3474777 | 5/2019 |
| EP | 3487385 | 5/2019 |
| EP | 3520706 | 8/2019 |
| EP | 3531897 | 9/2019 |
| EP | 3541472 | 9/2019 |
| EP | 3579907 | 12/2019 |
| EP | 3589238 | 1/2020 |
| EP | 3624701 | 3/2020 |
| EP | 2999412 | 5/2020 |
| EP | 3692949 | 8/2020 |
| EP | 3704780 | 9/2020 |
| EP | 3705154 | 9/2020 |
| EP | 3716877 | 10/2020 |
| EP | 3723586 | 10/2020 |
| EP | 3740163 | 11/2020 |
| EP | 3766431 | 1/2021 |
| EP | 3777657 | 2/2021 |
| EP | 3777961 | 2/2021 |
| EP | 3813933 | 5/2021 |
| EP | 3834737 | 6/2021 |
| EP | 3843618 | 7/2021 |
| EP | 3871626 | 9/2021 |
| EP | 3886761 | 10/2021 |
| EP | 3893731 | 10/2021 |
| EP | 3897369 | 10/2021 |
| EP | 3912676 | 11/2021 |
| EP | 3997776 | 5/2022 |
| EP | 4114514 | 1/2023 |
| EP | 4138981 | 3/2023 |
| EP | 4204076 | 7/2023 |
| EP | 4228733 | 8/2023 |
| EP | 4243925 | 9/2023 |
| EP | 4252263 | 10/2023 |
| IL | 176973 | 12/2006 |
| IL | 221127 | 9/2012 |
| IL | 226374 | 7/2013 |
| IL | 215975 | 11/2016 |
| IL | 227756 | 6/2017 |
| IL | 220201 | 8/2017 |
| IL | 253648 | 9/2017 |
| IL | 255379 | 12/2017 |
| IL | 252395 | 4/2020 |
| IN | 2011KN04472 | 7/2012 |
| IN | 2012KN01275 | 2/2013 |
| IN | 2013KN01954 | 11/2013 |
| IN | 2013CN06525 | 8/2014 |
| IN | 2012KN01988 | 8/2016 |
| JP | 2007527742 | 10/2007 |
| JP | 2010508093 | 3/2010 |
| JP | 2012196504 | 10/2012 |
| JP | 2013046784 | 3/2013 |
| JP | 2014503246 | 2/2014 |
| JP | 2014512869 | 5/2014 |
| JP | 2020509812 | 4/2020 |
| KR | 20010046155 | 6/2001 |
| WO | WO2005002467 | 1/2005 |
| WO | WO2005074367 | 8/2005 |
| WO | WO2007083288 | 7/2007 |
| WO | WO2008055301 | 5/2008 |
| WO | WO2008089726 | 7/2008 |
| WO | WO2010000026 | 1/2010 |
| WO | WO2010128501 | 11/2010 |
| WO | WO2010129089 | 11/2010 |
| WO | WO2011093941 | 8/2011 |
| WO | WO2011094521 | 8/2011 |
| WO | WO2012071075 | 5/2012 |
| WO | WO2012085913 | 6/2012 |
| WO | WO2012109557 | 8/2012 |
| WO | WO2013014539 | 1/2013 |
| WO | WO2013096965 | 6/2013 |
| WO | WO2014091222 | 6/2014 |
| WO | WO2014150106 | 9/2014 |
| WO | WO2014188279 | 11/2014 |
| WO | WO2016014821 | 1/2016 |
| WO | WO2016038115 | 3/2016 |
| WO | WO2016178171 | 11/2016 |
| WO | WO2017136767 | 8/2017 |
| WO | WO2017139606 | 8/2017 |
| WO | WO2017207981 | 12/2017 |
| WO | WO2017214740 | 12/2017 |
| WO | WO2018024868 | 2/2018 |
| WO | WO2018132549 | 7/2018 |
| WO | WO2018154138 | 8/2018 |
| WO | WO2018158747 | 9/2018 |
| WO | WO2019025785 | 2/2019 |
| WO | WO2019186101 | 2/2019 |
| WO | WO2019142152 | 7/2019 |
| WO | WO2019175401 | 9/2019 |
| WO | WO2019179447 | 9/2019 |
| WO | WO2019183078 | 9/2019 |
| WO | WO2019188917 | 10/2019 |
| WO | WO2019189079 | 10/2019 |
| WO | WO2019209420 | 10/2019 |
| WO | WO2020023514 | 1/2020 |
| WO | WO2020094085 | 5/2020 |
| WO | WO2020094087 | 5/2020 |
| WO | WO2020094094 | 5/2020 |
| WO | WO2020110048 | 6/2020 |
| WO | WO2020123338 | 6/2020 |
| WO | WO2020132678 | 6/2020 |
| WO | WO2020142515 | 7/2020 |
| WO | WO2020142613 | 7/2020 |
| WO | WO2020198694 | 10/2020 |
| WO | WO2020202046 | 10/2020 |
| WO | WO2020206366 | 10/2020 |
| WO | WO2020215090 | 10/2020 |
| WO | WO2020217194 | 10/2020 |
| WO | WO2020219265 | 10/2020 |
| WO | WO2020225698 | 11/2020 |
| WO | WO2020225757 | 11/2020 |
| WO | WO2020229636 | 11/2020 |
| WO | WO2020234751 | 11/2020 |
| WO | WO2020251700 | 12/2020 |
| WO | WO2020259492 | 12/2020 |
| WO | WO2021025905 | 2/2021 |
| WO | WO2021026485 | 2/2021 |
| WO | WO2021046753 | 3/2021 |
| WO | WO2021050589 | 3/2021 |
| WO | WO2021055264 | 3/2021 |
| WO | WO2021061272 | 4/2021 |
| WO | WO2021065873 | 4/2021 |
| WO | WO2021065874 | 4/2021 |
| WO | WO2021065875 | 4/2021 |
| WO | WO2021065912 | 4/2021 |
| WO | WO2021072315 | 4/2021 |
| WO | WO2021086707 | 5/2021 |
| WO | WO2021091566 | 5/2021 |
| WO | WO2021096766 | 5/2021 |
| WO | WO2021101707 | 5/2021 |
| WO | WO2021113670 | 6/2021 |
| WO | WO2021126699 | 6/2021 |
| WO | WO2021136252 | 7/2021 |
| WO | WO2021136261 | 7/2021 |
| WO | WO2021138041 | 7/2021 |
| WO | WO2021146342 | 7/2021 |
| WO | WO2021150765 | 7/2021 |
| WO | WO2021158559 | 8/2021 |
| WO | WO2021159001 | 8/2021 |
| WO | WO2021162888 | 8/2021 |
| WO | WO2021178636 | 9/2021 |
| WO | WO2021190547 | 9/2021 |
| WO | WO2021212011 | 10/2021 |
| WO | WO2021216964 | 10/2021 |
| WO | WO2021217055 | 10/2021 |
| WO | WO2021217059 | 10/2021 |

(56) References Cited

FOREIGN PATENT DOCUMENTS

| | | |
|---|---|---|
| WO | WO2021224736 | 11/2021 |
| WO | WO2021252397 | 12/2021 |
| WO | WO2022043555 | 3/2022 |
| WO | WO2022046921 | 3/2022 |
| WO | WO2022076601 | 4/2022 |
| WO | WO2022081980 | 4/2022 |
| WO | WO2022103973 | 5/2022 |
| WO | WO2022165320 | 8/2022 |
| WO | WO2022192280 | 9/2022 |
| WO | WO2022197748 | 9/2022 |
| WO | WO2022261492 | 12/2022 |
| WO | WO2022266465 | 12/2022 |
| WO | WO2022266503 | 12/2022 |
| WO | WO2022269278 | 12/2022 |
| WO | WO2022272131 | 12/2022 |
| WO | WO2023278612 | 1/2023 |
| WO | WO2023278725 | 1/2023 |
| WO | WO2023280858 | 1/2023 |
| WO | WO2023026124 | 3/2023 |
| WO | WO2023028164 | 3/2023 |
| WO | WO2023031039 | 3/2023 |
| WO | WO2023097337 | 6/2023 |
| WO | WO2023141266 | 7/2023 |
| WO | WO2023156529 | 8/2023 |
| WO | WO2023177690 | 9/2023 |
| WO | WO2023183417 | 9/2023 |

OTHER PUBLICATIONS

Lehner et al., "The Creation of an Interatrial Right-To-Left Shunt in Patients with Severe, Irreversible Pulmonary Hypertension: Rationale, Devices, Outcomes," Current Cardiology Reports (2019) 21: 31, https://doi.org/10.1007/s11886-019-1118-8; 9 pages.

International Search Report and Written Opinion received for International Application No. PCT/US19/69106 filed Dec. 31, 2019; Applicant: Shifamed Holdings, LLC; Date of Mailing: Mar. 23, 2020; 10 pages.

International Search Report and Written Opinion received for International Application No. PCT/US20/49996 filed Sep. 9, 2020; Applicant: Shifamed Holdings, LLC; Date of Mailing: Feb. 17, 2021; 16 pages.

International Search Report and Written Opinion received for International Application No. PCT/US20/063360 filed Dec. 4, 2020; Applicant: Shifamed Holdings, LLC; Date of Mailing: Apr. 5, 2021; 13 pages.

International Search Report and Written Opinion received for International Application No. PCT/US20/64529 filed Dec. 11, 2020; Applicant: Shifamed Holdings, LLC; Date of Mailing: Apr. 8, 2021; 12 pages.

International Search Report and Written Opinion received for International Application No. PCT/US19/68354, filed Dec. 23, 2019; Applicant: Shifamed Holdings, LLC; Date of Mailing: Mar. 17, 2020; 11 pages.

International Search Report and Written Opinion received for International Application No. PCT/US21/16932, filed Feb. 5, 2021; Applicant: Shifamed Holdings, LLC; Date of Mailing: Jun. 3, 2021; 11 pages.

International Search Report and Written Opinion received for International Application No. PCT/US21/14433, filed Jan. 21, 2021; Applicant: Shifamed Holdings, LLC; Date of Mailing: May 14, 2021; 16 pages.

International Search Report and Written Opinion received for International Application No. PCT/US21/28926, filed Apr. 23, 2021 ; Applicant: Shifamed Holdings, LLC; Date of Mailing: Jul. 22, 2021; 16 pages.

International Search Report and Written Opinion received for International Application No. PCT/US20/12059, filed Jan. 2, 2020; Applicant: Shifamed Holdings, LLC; Date of Mailing: Jun. 5, 2020; 12 pages.

International Search Report and Written Opinion received for International Application No. PCT/US20/25509, filed Mar. 27, 2020; Applicant: Shifamed Holdings, LLC; Date of Mailing: Jun. 25, 2020; 9 pages.

International Search Report and Written Opinion received for International Application No. PCT/US20/26738, filed Apr. 3, 2020; Applicant: Shifamed Holdings, LLC; Date of Mailing: Jun. 30, 2020; 8 pages.

International Search Report and Written Opinion received for International Application No. PCT/US21/28931, filed Apr. 23, 2021 ; Applicant: Shifamed Holdings, LLC; Date of Mailing: Sep. 24, 2021; 20 pages.

International Search Report and Written Opinion received for International Application No. PCT/US21/27747, filed Apr. 16, 2021; Applicant: Shifamed Holdings, LLC; Date of Mailing: Oct. 1, 2021; 16 pages.

International Search Report and Written Opinion received for International Application No. PCT/US21/53836, filed Oct. 6, 2021; Applicant: Shifamed Holdings, LLC; Date of Mailing: Jan. 25, 2022; 20 pages.

International Search Report and Written Opinion received for International Application No. PCT/US21/47573, filed Aug. 25, 2021; Applicant: Shifamed Holdings, LLC; Date of Mailing: Feb. 3, 2022; 15 pages.

Kocaturk, O. et al., "Whole shaft visibility and mechanical performance for active MR catheters using copper-nitinol braided polymer tubes," Journal of Cardiovascular Magnetic Resonance. Aug. 12, 2009, vol. 11, No. 29, pp. 9, col. 1, In 5-6.

Hossain, M. et al. "In situ preparation of graphene-ZnO composites for enhanced graphite exfoliation and graphene-nylon-6 composite films," Journal of Applied Polymer Science, Dec. 5, 2016, vol. 134, No. 27, p. 8, In 15-16,.

International Search Report and Written Opinion received for International Application No. PCT/US21/55191, filed Oct. 15, 2021; Applicant: Shifamed Holdings, LLC; Date of Mailing: Mar. 1, 2022; 12 pages.

Anomet Products "Conductive Nitinol Wire" Aug. 15, 2020 (Aug. 15, 2020) Retrieved from website <URL: https://helpx.adobe.com/acrobat/using/allow-or-block-links-internet.html?mv=product&mv2=acrobat>, 4 pages.

International Search Report and Written Opinion received for International Application No. PCT/US21/58996, filed Nov. 11, 2021; Applicant: Shifamed Holdings, LLC; Date of Mailing: Feb. 7, 2022; 23 pages.

International Search Report and Written Opinion received for International Application No. PCT/US22/35764, filed Jun. 30, 2022; Applicant: Shifamed Holdings, LLC; Date of Mailing: Sep. 19, 2022; 10 pages.

International Search Report and Written Opinion received for International Application No. PCT/US22/34027, filed Jun. 17, 2022; Applicant: Shifamed Holdings, LLC; Date of Mailing: Oct. 25, 2022; 8 pages.

International Search Report and Written Opinion received for International Application No. PCT/US22/34995, filed Jun. 24, 2022; Applicant: Shifamed Holdings, LLC; Date of Mailing: Nov. 18, 2022; 17 pages.

Perk et al., "Catheter-based left atrial appendage occlusion procedure: role of echocardiography," published on behalf of the European Society of Cardiology, Sep. 8, 2011, 7 pages.

Collado et al., "Left Atrial Appendage Occlusion for Stroke Prevention in Nonvalvular Atrial Fibrillation," Journal of the American Heart Association, Jun. 2021, 18 pages.

Ando et al., "Left ventricular decompression through a patent foramen ovale in a patient with hypertrophic cardiomyopathy: a case report," Cardiovascular Ultrasound vol., Article No. 2 (2004).

Braunwald, Heart Disease, Chapter 6, 2015, p. 186.

Bridges et al., "The Society of Thoracic Surgeons practice guideline series: transmyocardial laser revascularization," The Annals of Thoracic Surgery, vol. 77, Issue 4, Apr. 2004, pp. 1494-1502.

Bristow et al., "Improvement in cardiac myocyte function by biological effects of medical therapy: A new concept in the treatment of heart failure," European Heart Journal, vol. 16, Issue suppl. F, Jul. 1995, pp. 20-31.

(56) References Cited

OTHER PUBLICATIONS

Case et al., "Relief of High Left-Atrial Pressure in Left-Ventricular Failure," Lancet, Oct. 17, 1964, pp. 841-842.
Coats et al., "Controlled trial of physical training in chronic heart failure. Exercise performance, hemodynamics, ventilation, and autonomic function," Circulation, 1992;85:2119-2131.
Davies et al., "Reduced contraction and altered frequency response of isolated ventricular myocytes from patients with heart failure," Circulation, (1995), 92:2540-2549, Circulation, (1995), 92:2540-2549.
Ennezat et al., "An unusual case of low-flow, low gradient severe aortic stenosis: Left-to-right shunt due to atrial septal defect," Cardiology, (2009), 113(2):146-148.
Ewert et al., "Masked Left Ventricular Restriction in Elderly Patients With Atrial Septal Defects: A Contraindication for Closure," Catheterization and Cardiovascular Interventions, 52: 177-180, 2001.
Ewert et al., "Acute left heart failure after interventional occlusion of an atrial septal defect," Z. Kardiol., Catheterization and Cardiovascular Interventions, Z. Kardiol., (May 2001), 90(5):362-366.
Geiran et al., "Changes in cardiac dynamics by opening an interventricular shunt in dogs," J. Surg. Res., (Jan. 1990), 48(1):6-12.
Gelernter-Yaniv et al., "Transcatheter closure of left-to-right interatrial shunts to resolve hypoxemia," Congenit. Heart Dis., (Jan. 2008), 31(1):47-53.
Gewillig et al., "Creation with a stent of an unrestrictive lasting atrial communication," Cardio. Young, (2002), 12(4):404-407.
Khositseth et al., "Transcatheter Amplatzer Device Closure of Atrial Septal Defect and Patent Foramen Ovale in Patients With Presumed Paradoxical Embolism," Mayo Clinic Proc., 79:35-41 (2004).
Kramer et al., "Controlled study of captopril in chronic heart failure: A rest and exercise hemodynamic study," Circulation, (1983), 67(4):807-816.
Lai et al., "Bidirectional shunt through a residual atrial septal defect after percutaneous transvenous mitral commissurotomy," Cardiology, (1993), 83(3):205-207.
Lemmer et al., "Surgical implications of atrial septal defect complicating aortic balloon valvuloplasty," Ann. thorac. Surg., (Aug. 1989), 48(2):295-297.
Park et al., "Blade atrial septostomy: collaborative study," Circulation, 66(2):258-266 (1982).
Roven et al., "Effect of Compromising Right Ventricular Function in Left Ventricular Failure by Means of Interatrial and Other Shunts," American Journal Cardiology, 24:209-219 (1969).
Salehian et al., "Improvements in Cardiac Form and Function After Transcatheter Closure of Secundum Atrial Septal Defects," Journal of the American College of Cardiology, 45(4):499-504 (2005).
Schmitto et al., "Chronic heart failure induced by multiple sequential coronary microembolization in sheep," The International Journal of Artificial Organs, 31(4):348-353 (2008).
Schubert et al., "Left ventricular conditioning in the elderly patient to prevent congestive heart failure after transcatheter closure of the atrial septal defect," Catheter Cardiovasc. Interv., (2005), 64(3):333-337.
Stormer et al., "Comparative study of in vitro flow characteristics between a human aortic valve and a designed aortic and six corresponding types of prosthetic heart valves," European Surgical Research, (1976), 8(2):117-131.
Stumper et al., "Modified technique of stent fenestration of the atrial septum, Heart," (2003), 89:1227-1230.
Trainor et al., "Comparative Pathology of an Implantable Left Atrial Pressure Sensor," ASAIO Journal, Clinical Cardiovascular/Cardiopulmonary Bypass, 59(5):486-92 (2013).
Zhou et al., "Unidirectional valve patch for repair of cardiac septal defects with pulmonary hypertension," Annals of Thoracic Surgeons, 60: 1245-1249, 1995.
Extended European Search Report received for Application No. 20896031.0, Applicant: Shifamed Holdings, LLC; Date of Mailing: Dec. 7, 2023; 11 pages.

Abidin et al., "Design of Interdigital Structured Supercapacitor for Powering Biomedical Devices," 2011 IEEE Regional Symposium on Micro and Nano Electronics, pp. 88-91, Sep. 28-30, 2011, 4 pages.
Abidin et al., "Interdigitated MEMS Supercapacitor for Powering Heart Pacemaker," In Tech, Nov. 2, 2016, 21 pages.
Aqueveque et al., "Wireless power system for charge supercapacitors as power sources for implantable devices," 2015 IEEE PELS Workshop on Emerging Technologies: Wireless Power (2015 WoW), Daejeon, South Korea, pp. 1-5, Jun. 5, 2015, 5 pages.
Baker, "New Mesh Technology Helps Holds Down Infection Rates In Pacemakers," KERA News, Jul. 29, 2019, 3 pages.
Chae et al., "A durable high-energy implantable energy storage system with binder-free electrodes useable in body fluids," Journal of Materials Chemistry A, Feb. 1, 2022, 11 pages.
Chae et al., "Electrode materials for biomedical patchable and implantable energy storage devices," Energy Storage Materials, vol. 24, pp. 113-128, Apr. 24, 2019, 16 pages.
Chen et al., "Stretchable Supercapacitors as Emergent Energy Storage Units for Health Monitoring Bioelectronics," Advanced Healthcare Materials, Dec. 10, 2019, 27 pages.
DeLong et al., "Wireless Energy Harvesting for Medical Applications," 2015 IEEE International Symposium on Antennas and Propagation & USNC/URSI National Radio Science Meeting, Vancouver, BC, Canada, Jul. 19-24, 2015, 1 page.
Fadhel et al., "Resonant Inductive Coupling for Wirelessly Powering Active Implants: Current Issues, Proposed Solutions and Future Technological attempts," Advanced Systems for Biomedical Application, Smart Sensors, Measurement and Instrumentation, vol. 39, Jul. 20, 2021, 37 pages.
Gall et al., "A Batteryless Energy Harvesting Storage System for Implantable Medical Devices Demonstrated In Situ," Circuits, Systems, and Signal Processing, Aug. 11, 2018, 14 pages.
Guida et al., "A 700 KHz Ultrasonic Link for Wireless Powering of Implantable Medical Devices," 2016 IEEE Sensors Conference, Oct. 30, 2016, 3 pages.
Guida et al., "Ultrasonically Rechargeable Platforms for Closed-Loop Distributed Sensing and Actuation in the Human Body," 2018 IEEE 19th International Workshop on Signal Processing Advances in Wireless Communications (SPAWC), Kalamata, Greece, 2018, pp. 1-5, Jun. 25-28, 2018, 5 pages.
He et al., "Biocompatible carbon nanotube fibers for implantable supercapacitors," Carbon, vol. 122, pp. 162-167, Oct. 2017, 6 pages.
Hu et al., "Wireless Power Supply for ICP Devices With Hybrid Supercapacitor and Battery Storage," IEEE Journal of Emerging and Selected Topics in Power Electronics, vol. 4, No. 1, pp. 273-279, Mar. 2016, 7 pages.
Kassanos et al., "Power and data communication in wearable and implantable devices," Wearable Sensors (Second Edition), pp. 279-309, Jan. 1, 2021, 31 pages.
Kim et al., "New and Emerging Energy Sources for Implantable Wireless Microdevices," IEEE Access, vol. 3, pp. 89-98, Feb. 23, 2015, 10 pages.
Lamberti et al., "TiO2 nanotube array as biocompatible electrode in view of implantable supercapacitors," Journal of Energy Storage, vol. 8, pp. 193-197, Aug. 27, 2016, 5 pages.
Lv et al., "A Degradable and Biocompatible Supercapacitor Implant Based on Functional Sericin Hydrogel Electrode," Advanced Materials Technologies, Mar. 2, 2023, 10 pages.
Mahesh et al., "Design Analysis of Defibrillator and Implementing Wireless Charging System," 2020 5th International Conference on Communication and Electronics Systems (ICCES), pp. 295-299, Jun. 10-12, 2020, 5 pages.
Mendoza-Ponce et al., "Super-capacitors for implantable medical devices with wireless power transmission," 2018 14th Conference on Ph.D. Research in Microelectronics and Electronics (PRIME), Prague, Czech Republic, 2018, pp. 241-244, Jul. 2-5, 2018, 4 pages.
Meng et al., "A flexible super-capacitive solid-state power supply for miniature implantable medical devices," Biomed Microdevices, Jul. 9, 2013, 11 pages.
Meng et al., "Ultrasmall Integrated 3D Micro-Supercapacitors Solve Energy Storage for Miniature Devices," Advanced Energy Materials, Dec. 12, 2013, 7 pages.

(56) References Cited

OTHER PUBLICATIONS

Monti et al., "Resonant Inductive Link for Remote Powering of Pacemakers," IEEE Transactions on Microwave Theory and Techniques, vol. 63, No. 11, pp. 3814-3822, Nov. 2015, 9 pages.

Mosa et al., "Ultrathin Graphene-Protein Supercapacitors for Miniaturized Bioelectronics," Advanced Energy Materials, Sep. 6, 2017, 21 pages.

Pandey et al., "Integration of Supercapacitors into Wirelessly Charged Biomedical Sensors," 2011 6th IEEE Conference on Industrial Electronics and Applications, Beijing, China, Jun. 21-23, 2011, pp. 56-61, 6 pages.

Park et al., "An implantable anti-biofouling biosupercapacitor with high energy performance," Biosensors and Bioelectronics, May 30, 2023, 16 pages.

Rabin et al., "Operability of Implantable Integrated Implants' Wireless Charging Device and Biotelemetric System," 2019 25th Conference of Open Innovations Association (FRUCT), Helsinki, Finland, 2019, pp. 257-264, Nov. 5-8, 2019, 8 pages.

Rita et al., "Effect of Supercapacitor on Power Supply for Rechargeable Implanted Medical Devices," Recent Innovations in Computing, ICRIC 2020, Lecture Notes in Electrical Engineering, vol. 701, pp. 123-134, Springer Nature Singapore Pte Ltd., Jan. 13, 2021, 12 pages.

Sanchez et al., "An Energy Management IC for Bio-Implants Using Ultracapacitors for Energy Storage," 2010 Symposium on VLSI Circuits, Jun. 15-17, 2010, 2 pages.

Sheng et al., "A soft implantable energy supply system that integrates wireless charging and biodegradable Zn-ion hybrid supercapacitors," Science Advances, Nov. 15, 2023, 17 pages.

Sheng et al., "A thin, deformable, high-performance supercapacitor implant that can be biodegraded and bioabsorbed within an animal body," Science Advances, Jan. 8, 2021, 11 pages.

Sheng et al., "Recent Advances of Energy Solutions for Implantable Bioelectronics," Advanced Healthcare Materials, Apr. 30, 2021, 25 pages.

Sim et al., "Biomolecule based fiber supercapacitor for implantable device," Nano Energy, vol. 47, pp. 385-392, May 2018, 8 pages.

Skunik-Nuckowska et al., "Integration of supercapacitors with enzymatic biobatteries toward more effective pulse-powered use in small-scale energy harvesting devices," Journal of Applied Electrochemistry, vol. 44, pp. 497-507, Jan. 4, 2014, 11 pages.

Su et al., "Stretchable Transparent Supercapacitors for Wearable and Implantable Medical Devices," Advanced Materials Technologies, Sep. 23, 2021, 6 pages.

Tian et al., "Implantable and Biodegradable Micro-Supercapacitor Based on a Superassembled Three-Dimensional Network Zn@PPy Hybrid Electrode," ACS Applied Materials Interfaces, Feb. 14, 2021, 10 pages.

Tran et al., "A compact wireless power transfer system at 915 MHz with supercapacitor for optogenetics applications," Sensors and Actuators A: Physical, Nov. 20, 2018, 9 pages.

Ungureanu et al., "Using of ISM radio bands for wireless charging of medical implants," 9th International Conference on Microelectronics and Computer Science, Chisinau, Republic of Moldova, Oct. 19-21, 2017, 4 pages.

Vanderbilt Heart and Vascular Institute, "'Envelope' reduces cardiac implant infections," VUMC Reporter, Aug. 8, 2013, retrieved from website <URL: http://news.vanderbilt.edu/2013/08/envelop-reduces-cardiac-implant-infections/resorbablecardiac-implant>, 2 pages.

Wu et al., "Subcutaneous Solar Energy Harvesting for Self-Powered Wireless Implantable Sensor Systems," 2018 40th Annual International Conference of the IEEE Engineering in Medicine and Biology Society (EMBC), Honolulu, HI, USA, pp. 4657-4660, Jul. 18-21, 2018, 4 pages.

Xu et al., "Minimally invasive power sources for implantable electronics," Exploration, Jun. 8, 2023, 20 pages.

Extended European Search Report received for Application No. 21793483.5, Applicant: Shifamed Holdings, LLC; Date of Mailing: Apr. 18, 2024; 11 pages.

POWER MANAGEMENT FOR INTERATRIAL SHUNTS AND ASSOCIATED SYSTEMS AND METHODS

CROSS-REFERENCE TO RELATED APPLICATION(S)

This application is a 35 U.S.C. § 371 U.S. National Phase application of International Patent Application No. PCT/US2021/028931, filed Apr. 23, 2021, which claims the benefit of U.S. Provisional Patent Application No. 63/014,340, filed Apr. 23, 2020, each of which is herein incorporated by reference in its entirety.

TECHNICAL FIELD

The present technology generally relates to implantable medical devices and, in various aspects, to implantable devices for treating heart failure such as shunts and associated systems and methods.

BACKGROUND

Implantable shunting systems are widely used to treat a variety of patient conditions by shunting fluid from a first body region/cavity to a second body region/cavity. The flow of fluid through the shunting systems is primarily controlled by the pressure gradient across the shunt lumen and the geometry (e.g., size) of the shunt lumen. One challenge with conventional shunting systems is selecting the appropriate geometry of the shunt lumen for a particular patient. A lumen that is too small may not provide enough therapy to the patient, while a lumen that is too large may create new issues in the patient. Despite this, most conventional shunts cannot be adjusted once they have been implanted. Accordingly, once the system is implanted, the therapy provided by the shunting system cannot be adjusted or titrated to meet the patient's individual needs.

As a result of the above, shunting systems with adjustable lumens have recently been proposed to provide a more personalized or titratable therapy. Such systems enable clinicians to titrate the therapy to an individual patient's needs, as well as adjust the therapy over time as the patient's disease changes. Adjustable shunting systems, however, generally require energy to drive the adjustment. Energy can be delivered invasively (e.g., energy delivered via a catheter) or non-invasively (e.g., energy delivered to an implanted battery via induction). The energy required to adjust the shunt varies depending on the actuation mechanism incorporated into the shunting system.

BRIEF DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

DETAILED DESCRIPTION

Figure 1:
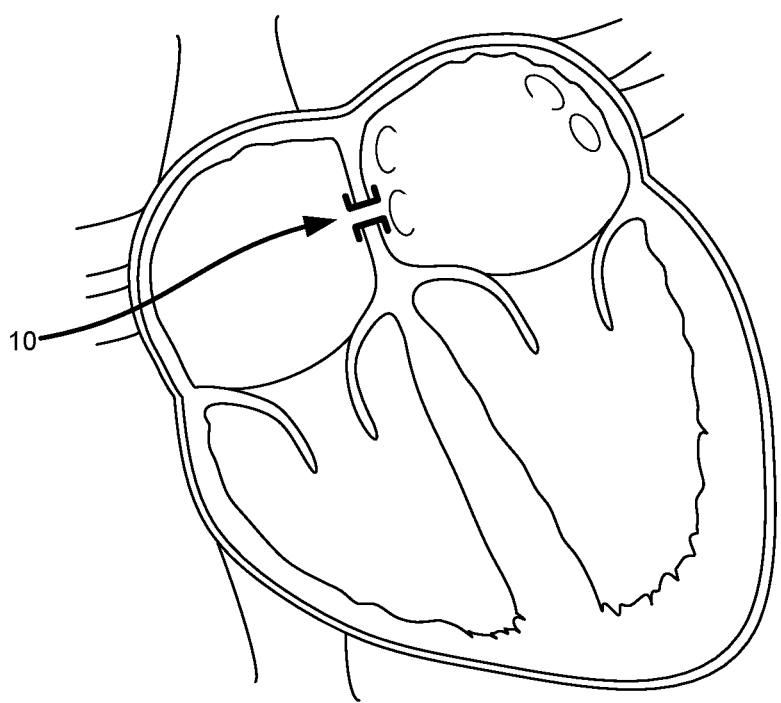
FIG. 1 is a schematic illustration of an interatrial device implanted in a heart and configured in accordance with an embodiment of the present technology.

The present technology is generally directed to methods for operating interatrial shunting systems that include a shunting element implanted in a patient's heart. A method configured in accordance with an embodiment of the present technology can include, for example, receiving a signal indicating that an active electronic component carried by the shunting element is to be operated. The method can also include selecting an energy source from a plurality of energy sources for powering the active electronic component. The selected energy source can have one or more power output characteristics capable of accommodating one or more power consumption characteristics of the active electronic component. The method can further include operating the active electronic component using power from the selected energy source. In some embodiments, some or all of the steps of the method are performed via a processor implanted in the patient's heart and/or carried by the shunting element.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the examples but are not described in detail with respect to FIGS. 1-4.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%.

As used herein, the terms "interatrial device," "interatrial shunt device," "IAD," "IASD," "interatrial shunt," and "shunt" are used interchangeably to refer to a device that, in at least one configuration, includes a shunting element that provides a blood flow between a first region (e.g., a LA of a heart) and a second region (e.g., a RA or coronary sinus of the heart) of a patient. Although described in terms of a shunt between the atria, namely the left and right atria, one will appreciate that the technology may be applied equally to devices positioned between other chambers and passages of the heart, or between other parts of the cardiovascular system. For example, any of the shunts described herein, including those referred to as "interatrial," may be nevertheless used and/or modified to shunt between the LA and the coronary sinus, or between the right pulmonary vein and the superior vena cava. Moreover, while the disclosure herein primarily describes shunting blood from the LA to the RA, the present technology can be readily adapted to shunt blood from the RA to the LA to treat certain conditions, such as pulmonary hypertension. For example, mirror images of embodiments, or in some cases identical embodiments, used to shunt blood from the LA to the RA can be used to shunt blood from the RA to the LA in certain patients.

The headings provided herein are for convenience only and do not interpret the scope or meaning of the claimed present technology.

A. Interatrial Shunts for Treatment of Heart Failure

Heart failure can be classified into one of at least two categories based upon the ejection fraction a patient experiences: (1) HFpEF, historically referred to as diastolic heart failure or (2) HFrEF, historically referred to as systolic heart failure. One definition of HFrEF is a left ventricular ejection fraction lower than 35%-40%. Though related, the underlying pathophysiology and the treatment regimens for each heart failure classification may vary considerably. For example, while there are established pharmaceutical therapies that can help treat the symptoms of HFrEF, and at times slow or reverse the progression of the disease, there are limited available pharmaceutical therapies for HFpEF with only questionable efficacy.

In heart failure patients, abnormal function in the left ventricle (LV) leads to pressure build-up in the LA. This leads directly to higher pressures in the pulmonary venous system, which feeds the LA. Elevated pulmonary venous pressures push fluid out of capillaries and into the lungs. This fluid build-up leads to pulmonary congestion and many of the symptoms of heart failure, including shortness of breath and signs of exertion with even mild physical activity. Risk factors for HF include renal dysfunction, hypertension, hyperlipidemia, diabetes, smoking, obesity, old age, and obstructive sleep apnea. HF patients can have increased stiffness of the LV which causes a decrease in left ventricular relaxation during diastole resulting in increased pressure and inadequate filling of the ventricle. HF patients may also have an increased risk for atrial fibrillation and pulmonary hypertension, and typically have other comorbidities that can complicate treatment options.

Interatrial shunts have recently been proposed as a way to reduce elevated left atrial pressure, and this emerging class of cardiovascular therapeutic interventions has been demonstrated to have significant clinical promise. FIG. 1 shows the conventional placement of a shunt in the septal wall between the LA and RA. Most conventional interatrial shunts (e.g., shunt 10) involve creating a hole or inserting a structure with a lumen into the atrial septal wall, thereby creating a fluid communication pathway between the LA and the RA. As such, elevated left atrial pressure may be partially relieved by unloading the LA into the RA. In early clinical trials, this approach has been shown to improve symptoms of heart failure.

One challenge with many conventional interatrial shunts is determining the most appropriate size and shape of the shunt lumen. A lumen that is too small may not adequately unload the LA and relieve symptoms; a lumen that is too large may overload the RA and right-heart more generally, creating new problems for the patient. Moreover, the relationship between pressure reduction and clinical outcomes and the degree of pressure reduction required for optimized outcomes is still not fully understood, in part because the pathophysiology for HFpEF (and to a lesser extent, HFrEF) is not completely understood. As such, clinicians are forced to take a best guess at selecting the appropriately sized shunt (based on limited clinical evidence) and generally cannot adjust the sizing over time. Worse, clinicians must select the size of the shunt based on general factors (e.g., the size of the patient's anatomical structures, the patient's hemodynamic measurements taken at one snapshot in time, etc.) and/or the design of available devices rather than the individual patient's health and anticipated response. With many such traditional devices, the clinician does not have the ability to adjust or titrate the therapy once the device is implanted, for example, in response to changing patient conditions such as progression of disease. By contrast, interatrial shunting systems configured in accordance with embodiments of the present technology allow a clinician to select the size—perioperatively or post-implant—based on the patient.

B. Select Embodiments of Methods for Operating Interatrial Shunting Systems

As provided above, the present technology is generally directed to methods for operating interatrial shunting systems. Such systems include a shunting element implantable into a patient at or adjacent to a septal wall. The shunting element can fluidly connect the LA and the RA of the patient to facilitate blood flow therebetween. In some embodiments, the systems further include various active electronic components carried by or otherwise associated with the shunting element, such as sensors, flow control mechanisms, communication devices, processors, and memory. Active electronic components may be differentiated from passive electronic components that do not have dedicated power terminals. The systems herein can include and/or be operably coupled to a plurality of different types of energy sources for powering operation of the active electronic components, including energy sources implanted within the patient's body, energy sources external to the patient's body, rechargeable energy sources, non-rechargeable energy sources, and so on.

In some embodiments, some or all of the active electronic components have different power consumption characteristics (e.g., minimum, maximum, and/or average power consumption, etc.). In some embodiments, the power consumption characteristics of different active electronic components can vary over a wide range, e.g., over at least one, two, three, four, five, six, seven, or more orders of magnitude. For example, active electronic components utilized in adjusting a shunting element can consume greater amounts of power, while active electronic components utilized in acquiring sensor data can consume smaller amounts of power. To accommodate this broad range, the systems herein can include energy sources with different characteristics (e.g., minimum, maximum, and/or average power output; power density; energy density; etc.). The present technology can manage power transmission between multiple energy sources and multiple active electronic components to ensure that the active electronic components are receiving sufficient power to operate, while increasing the efficiency and useful lifetime of the energy sources. This approach is expected to improve the performance of interatrial shunting systems or other systems that have highly variable power consumption and are powered partially or wholly by implanted energy sources.

Figure 2:
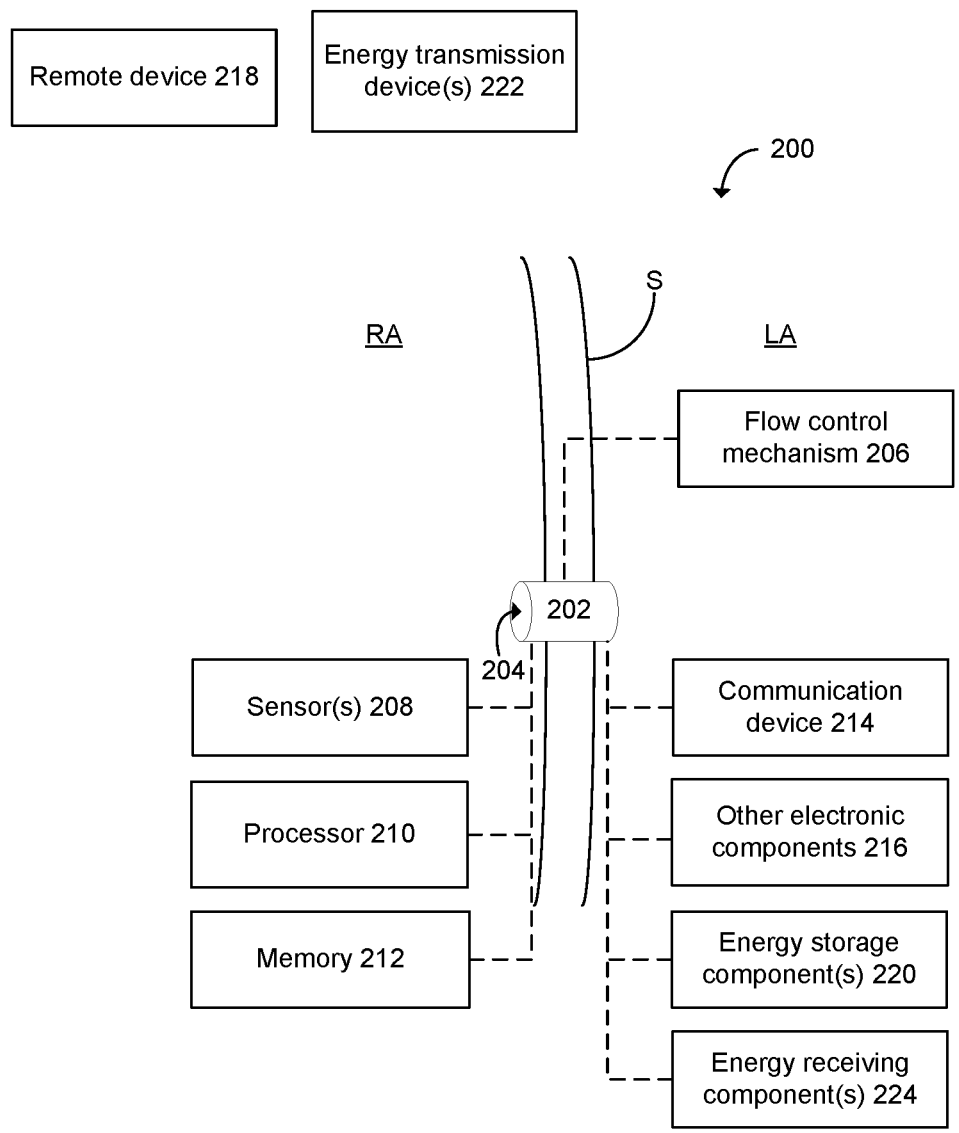
FIG. 2 is a schematic illustration of an interatrial shunting system configured in accordance with an embodiment of the present technology.

FIG. 2 is a schematic illustration of an interatrial shunting system 200 ("system 200") configured in accordance with an embodiment of the present technology. The system 200 includes a shunting element 202 defining a lumen 204 therethrough. When implanted in the septal wall S, the system 200 can fluidly connect the left atrium LA and the right atrium RA via the lumen 204. The system 200 can also include various electronic components carried by, operably coupled to, and/or otherwise associated with the shunting element 202, such as a flow control mechanism 206, one or more sensors 208, a processor 210, memory 212, a communication device 214, and/or other electronic components 216. Any or all of these electronic components may be configured as active electronic components. The electronic components can be configured to perform various operations related to the shunting element 202, as described in detail below.

The flow control mechanism 206 can be configured to change a size, shape, and/or other characteristic of the shunting element 202 to selectively modulate the flow of fluid through the lumen 204. For example, the flow control mechanism 206 can be configured to selectively increase a diameter of the lumen 204 and/or selectively decrease a diameter of the lumen 204 in response to an input. In other embodiments, the flow control mechanism 206 is configured to otherwise affect a shape and/or geometry of the lumen 204. Accordingly, the flow control mechanism 206 can be coupled to the shunting element 202 and/or can be included within the shunting element 202. In some embodiments, for example, the flow control mechanism 206 is part of the shunting element 202 and at least partially defines the lumen 204. In other embodiments, the flow control mechanism 206 is spaced apart from but operably coupled to the shunting element 202.

In some embodiments, at least a portion of the flow control mechanism 206 comprises a shape memory material, such as a shape memory metal or alloy (e.g., nitinol), a shape memory polymer, or a pH-based shape memory material. A shape memory material can be configured to change in shape (i.e., transform between a first configuration and a second configuration) in response to a stimulus (e.g., heat or mechanical loading), as is known to those of skill in the art. Alternatively or in combination, the flow control mechanism 206 can include an active motor operably coupled to one or more actuation elements that change a size of the lumen 204, a flow resistance through the lumen 204, and/or another characteristic of the shunting element 202. Suitable motors include electromagnetic motors, implanted battery and mechanical motors, MEMS motors, micro brushless DC motors, piezoelectric based motors, solenoids, shape memory alloy motors, heat engine motors, and other motors.

The sensor(s) 208 can be configured to measure one or more parameters of the system 200 (e.g., a characteristic or state of the shunting element 202 or lumen 204) and/or one or more physiological parameters of the patient (e.g., left atrial pressure, right atrial pressure). The sensor(s) 208 can be coupled to the shunting element 202 or can be positioned at a location within the heart or another region of the cardiovascular system spaced apart from the shunting element 202 (e.g., the left atrium LA, the right atrium RA, the septal wall S, the inferior vena cava, etc.). For example, the system 200 can include a first sensor positionable within or proximate to the left atrium LA to measure left atrial pressure, and a second sensor positionable within or proximate to the right atrium RA to measure right atrial pressure. Examples of sensor(s) 208 suitable for use with the embodiments herein include, but are not limited to, pressure sensors, impedance sensors, accelerometers, force/strain sensors, proximity sensors, distance sensors, temperature sensors, flow sensors, optical sensors, cameras, microphones or other acoustic sensors, ultrasonic sensors, ECG or other cardiac rhythm sensors, SpO2 and other sensors adapted to measure tissue and/or blood gas levels, blood volume sensors, and other sensors known to those who are skilled in the art. In some embodiments, the system 200 includes multiple different types of sensors, such as at least two, three, four, five, or more different sensors.

The processor 210 (e.g., a microprocessor, microcontroller, FPGA, ASIC, electronic control hardware, etc.) can be configured to perform various operations in accordance with corresponding instructions stored in the memory 212. For example, the processor 210 can be configured to receive data from the sensor(s) 208 and, optionally, store the data from the sensor(s) 208 in the memory 212. In some embodiments, the processor 210 receives a series of measurements from the sensor(s) 208 taken over a particular time period and/or at a particular frequency (e.g., a certain number of times per hour, day, week, etc.). As another example, the processor 210 can be configured to calculate a pressure differential between the left atrium LA and the right atrium RA based on sensor data and/or other relevant calculations, and/or store the calculated pressure differential in the memory 212.

In some embodiments, the processor 210 is operably coupled to the flow control mechanism 206 to control adjustments to the shunting element 202 and/or lumen 204, e.g., based on the parameters measured by the sensor(s) 208, the pressure differential calculated by the processor 210, input from a care provider or user, and/or other relevant data received by the processor 210 and/or stored in the memory 212. For example, if the calculated pressure differential falls outside of a predetermined range, the processor 210 can direct the flow control mechanism 206 to adjust the amount of blood flow through the shunting element 202. In some embodiments, the sensor(s) 208, processor 210, and the flow control mechanism 206 operate in a closed-loop system to adjust the shunting element 202.

In some embodiments, the processor 210 is configured to transmit data (e.g., sensor data, calculated pressure differential, etc.) via the communication device 214 to a remote device 218 located outside the patient's body (e.g., a controller mobile device, computing device, stand-alone data reader/interrogator, etc.). For example, the communication device 214 can be configured to transmit data from the sensor(s) 208 to an external hub or reader (e.g., for notification purposes, for processing and/or analysis, etc.). The communication device 214 can use any suitable type of wired or wireless communication method, including electromagnetic, ultrasound, or radiofrequency (e.g., WiFi, Bluetooth (such as BLE 5.0), MEDRadio, ZigBee, sub-GHz). In some embodiments, the communication device 214 can include multiple devices and/or implement multiple different communication modalities, e.g., to provide improved operational flexibility and reduce the power and/or energy requirements of the system 200. It is understood that wireless communication with "deep" implants well below the skin (e.g., system 200) can present greater challenges with wireless data and power transmission. The system 200 in accordance with certain embodiments can utilize wireless technology to connect external components with a hub and wired technology to connect the hub to the device electronics. For example, the system 200 may communicate to a subcutaneous device via a wired connection, and the subcutaneous device can communicate to the remote device 218 via a wireless connection, or vice versa. Optionally, the system 200 can use a series of wireless connections for communication.

The processor 210 can also be configured to receive data (e.g., control signals) from the remote device 218 via the communication device 214. The control signals can indicate that one or more components of the system 200 are to be operated. For example, the control signals can direct the sensor(s) 208 to measure one or more parameters and direct the processor 210 to store the sensor data in the memory 212 and/or transmit the sensor data to the remote device 218. As another example, the control signal can direct the flow control mechanism 206 to adjust the shunting element 202 and/or lumen 204. In some embodiments, for example, a physician inputs the desired flow characteristics for the shunting element 202 and the remote device 218 can communicate with the flow control mechanism 206 (via the communication device 214 and processor 210) such that the flow control mechanism 206 adjusts the shunting element 202 to achieve the desired flow characteristics through the shunting element 202. In other embodiments the physician can directly input the parameter of the shunting element 202 to be adjusted (e.g., a desired lumen diameter) and the remote device 218 can communicate with the flow control mechanism 206 to effectuate the adjustment.

Optionally, the system 200 can include one or more other electronic components 216 such as an analog-to-digital converter (ADC), a clock circuit or other timing circuit, or any other component suitable for use in the system 200. For example, the processor 210 can be operably coupled to an ADC in order to interface with analog components. As another example, the processor 210 can periodically receive signals from a clock circuit indicating that certain time-based operations should be performed (e.g., periodic collection of data by the sensor(s) 208, etc.), as described further below.

In some embodiments, the active electronic components of the system 200 (e.g., sensor(s) 208, processor 210, memory 212, communication device 214, other electronic components 216, etc.) use power from at least one energy source to operate, as described in detail below. Accordingly, the active electronic components can each be associated with a respective set of power consumption characteristics. The power consumption characteristics can correlate to an amount of power used by the component during operation. The power consumption characteristics can include, for example, a maximum or peak power consumption, a minimum power consumption, and/or an average power consumption during operation. In some embodiments, some or all of the active electronic components can have different power consumption characteristics. For example, the power consumption of the flow control mechanism 206 can differ from (e.g., be greater than) the power consumption of the communication device 214, which can differ from (e.g., be greater than) the power consumption of the sensor(s) 208, processor 210, and/or memory 212.

In some embodiments, the power consumption characteristics of the active electronic components of the system 200 vary over a wide range (e.g., over at least one, two, three, four, five, six, seven, or more orders of magnitude). For example, the system 200 can include a first active electronic component and a second active electronic component, the first active electronic component having a power consumption greater than or equal to 100 W, 50 W, 20 W, 10 W, 1 W, 20 mW, 10 mW, 1 mW, 10 µW, or 1 µW; and the second active electronic component having a power consumption less than or equal to 10 W, 1 W, 20 mW, 10 mW, 1 mW, 10 µW, 1 µW, or 0.1 µW. In some embodiments, the flow control mechanism 206 has a peak power consumption within a range from 100 mW to 100 W (e.g., approximately 20 W), the communication device 214 has a peak power consumption within a range from 1 mW to 100 mW (e.g., approximately 20 mW), the sensor(s) 208 and/or processor 210 have a peak power consumption within a range from 100 µW to 10 mW (e.g., approximately 1 mW), and the clock circuit and/or other components operating when the system 200 is quiescent have a peak power consumption within a range from 0.1 µW to 10 µW (e.g., approximately 1 µW).

In some embodiments, the power consumed during different operations performed by the system 200 can also vary over a wide range (e.g., over at least one, two, three, four, five, six, seven, or more orders of magnitude), depending on the active electronic components involved. For example, the system 200 can be configured to perform a "shunt adjustment" operation in which the flow control mechanism 206 adjusts at least one characteristic of the shunting element 202 and/or lumen 204 (e.g., changes lumen diameter). The power consumption associated with the shunt adjustment operation can be within a range from 100 mW to 10 W (e.g., on the order of 1 W). The system 200 can also be configured to perform a "remote communication" operation in which the communication device 214 transmit data to and/or receives data from the remote device 218. The power consumption associated with the remote communication operation can be within a range from 1 mW to 100 mW (e.g., on the order of 20 mW). The system 200 can further be configured to perform an "acquire sensor data" operation in which the sensor(s) 208 measure one or more parameters and the measurements are stored in the memory 212. The power consumption associated with the acquire sensor data operation can be within a range from 100 µW to 10 mW (e.g., on the order of 1 mW). Optionally, if no active operations are currently being performed, the system 200 can be in a "standby" state in the clock circuit is the only component receiving power while the other components remain unpowered. The power consumption associated with the standby state can be within a range from 0.1 µW to 10 µW (e.g., on the order of 1 µW).

For example, Table 1 below shows active electronic components involved in various system operations and the associated power consumption according to a particular embodiment of the present technology. The values listed in the header indicate the estimated power consumption associated with each system operation, and the power values listed in the first column indicate the estimated power consumption associated with each active electronic component.

TABLE 1

Active electronic components and power consumption for system operations

|  | Standby (0.1 µW) | Acquire Sensor Data (8 mW) | Remote Communication (21 mW) | Shunt Adjustment (20 W) |
|---|---|---|---|---|
| Clock circuit (0.1 µW) | X | X | X | X |
| ADC (1 mW) |  | X |  |  |
| Processor (5 mW) |  | X | X | X |
| Memory (1 mW) |  | X | X |  |

TABLE 1-continued

Active electronic components and power
consumption for system operations

|  | Standby (0.1 μW) | Acquire Sensor Data (8 mW) | Remote Communication (21 mW) | Shunt Adjustment (20 W) |
| --- | --- | --- | --- | --- |
| Sensors (1 mW) |  | X |  |  |
| Communication device (15 mW) |  |  | X |  |
| Flow control mechanism (20 W) |  |  |  | X |

The system 200 can include and/or be operably coupled to a plurality of energy sources for powering operation of the active electronic components. The energy sources can include any suitable combination of chargeable and non-rechargeable energy sources, and can include sources located external to the patient's body as well as sources located within the patient's body. For example, the energy sources can include one or more energy storage components 220 implanted within the patient's body and/or operably coupled to the shunting element 202 or another component of the system 200, and optionally one or more power transfer devices 222 located external to the patient's body. The energy sources can each be associated with a respective set of power output characteristics correlating to an amount of power that can be delivered by the energy source. The power output characteristics can include, for example, a maximum or peak power output, a minimum power output, and/or an average power output. In some embodiments, some or all of the energy sources can have different power output characteristics, as described in greater detail below. Alternatively or in combination, each of the energy sources can also be associated with energy storage characteristics, which in some embodiments may differ between some or all of the energy sources.

The energy storage component(s) 220 can include a primary battery (i.e., a non-rechargeable battery), a secondary battery (i.e., a rechargeable battery), a capacitor, a supercapacitor, and/or other suitable elements that can store and/or provide energy to the system. In some embodiments, the system 200 includes at least two different types of energy storage component(s) 220. For example, the energy storage component(s) 220 can include two or more of a primary battery, a secondary battery, a supercapacitor, or a capacitor. Optionally, the energy storage component(s) 220 can include at least one battery (e.g., a rechargeable battery and/or a non-rechargeable battery) and at least one of a supercapacitor or a capacitor.

In some embodiments, the energy storage component(s) 220 are configured for delivery into the patient's heart via percutaneous and/or catheter delivery techniques. As a result, the size (e.g. volume) of the energy storage component(s) 220 can be limited based on the size of the catheter used. For example, the energy storage component(s) 220 can each have a volume less than or equal to 5 cc, 4 cc, 3 cc, 2 cc, 1 cc, 0.9 cc, 0.8 cc, 0.7 cc, 0.6 cc, 0.5 cc, 0.4 cc, 0.3 cc, 0.2 cc, or 0.1 cc. These size constraints may limit the energy storage capacity of an individual energy storage component 220. The use of multiple different types of energy storage components as described herein is expected to ameliorate the capacity limitations imposed by percutaneous and/or catheter delivery techniques.

In some embodiments, the energy storage component(s) 220 are each associated with a respective set of power output characteristics (e.g., a maximum or peak power output, a minimum power output, an average power output, etc.). The energy storage component(s) 220 can also be associated with other characteristics relevant to power management, such as an energy density (e.g., a volumetric energy density), an energy storage capacity, a power density (e.g., a volumetric power density), a self-discharge time (i.e., how long the component can retain energy), and/or a cycle life (i.e., the number of times the component can be charged). In some embodiments, some or all of the energy storage component(s) 220 can have different characteristics. For example, a primary battery can have an energy density that is different from (e.g., greater than) an energy density of a secondary battery, which can have an energy density that is different from (e.g., greater than) an energy density of a supercapacitor, which can have an energy density that is different from (e.g., greater than) an energy density of a capacitor. As another example, a primary or non-rechargeable battery can have a power density that is different from (e.g., less than) a power density of a secondary or rechargeable battery, which can have a power density that is different from (e.g., less than) a power density of a supercapacitor, which can have a power density that is different from (e.g., less than) a power density of a capacitor.

For example, Table 2 below lists example characteristics of energy storage components configured in accordance with a particular embodiment of the present technology.

TABLE 2

Example characteristics of energy storage components

|  | Energy density (J/cc) | Power density (W/cc) | Self-discharge time | Cycle life (# cycles) |
| --- | --- | --- | --- | --- |
| Primary battery | 1000 | 0.003 | 10 year | 1 |
| Secondary battery | 100 | 0.03 | 1 year | 150 |
| Supercapacitor | 10 | 10 | 1 week | >100,000 |
| Capacitor | 0.01 | 100 | 10 seconds | unlimited |

The power transfer device(s) 222 can include any device or system external to the patient's body that is capable of wirelessly transmitting power to an implanted component (e.g., an inductive wireless charging device). For example, the power transfer device(s) 222 can be configured to transmit radiofrequency (RF) energy, microwave frequency energy, other forms of electromagnetic energy, ultrasonic energy, thermal energy, or other types of energy in accordance with techniques known to those of skill in the art. In some embodiments, the power transfer device(s) 222 can be part of the remote device 218 while in other embodiments, the power transfer device(s) 222 can be separate from the remote device 218. Optionally, the power transfer device(s) 222 can be devices that are configured to be positioned at least temporarily within the patient's body (e.g., an energy delivery catheter configured to be navigated proximate to the system 200 during a procedure).

The power transfer device(s) 222 can have different power output characteristics, e.g., depending on whether the source is designed for clinical use or for at home use. For example, a power transfer device 222 intended for clinical use and/or for operation by a medical professional can have a relatively high power transfer (e.g., greater than or equal to 10 W), while a power transfer device 222 intended for home use and/or for operation by a layperson (e.g., the patient) can have a relative low power transfer (e.g., less than or equal to 100 mW). In some embodiments, the patient has regular access to the home use device, but may only have periodic access to the clinical device (e.g., only during appointments with the clinician).

In some embodiments, the system 200 includes one or more energy receiving component(s) 224 operably coupled to the shunting element 202 and configured to receive energy from the power transfer device(s) 222. The energy receiving component(s) 224 can be or include one or more metallic coils adapted to receive electromagnetic energy transmitted to the system 200 from the power transfer device(s) 222. The energy receiving component(s) 224 can be made of copper, silver, gold, aluminum, stainless steel, nitinol, another suitable material, or suitable combinations of these materials. In some embodiments, the energy receiving component(s) 224 are configured to receive energy transmitted in the RF range. In other embodiments the energy receiving component(s) 224 can be configured to receive other forms of energy (e.g., ultrasonic, thermal, microwave frequency, etc.). Optionally, the energy receiving component(s) 224 can also be configured to transmit energy and/or signals to the remote device 218. In such embodiments, the energy receiving component(s) 224 can also operate as part of the communication device 214 for the system 200. In other embodiments the energy receiving component(s) 224 can be different from the communication device 214.

In some embodiments, power transmitted from the power transfer device(s) 222 and received by the energy receiving component(s) 224 is used to directly power operation of one or more active electronic components of the system 200. Alternatively or in combination, power transmitted from the power transfer device(s) 222 and received by the energy receiving component(s) 224 can be stored in the energy storage component(s) 220. For example, the power transfer device(s) 222 can be used to wirelessly recharge a rechargeable battery, a supercapacitor, or a capacitor. Subsequently, the energy stored in the energy storage component(s) 220 can be used to power operation of one or more active electronic components of the system 200.

For example, the flow control mechanism 206 can be adjustable using energy stored in the energy storage component(s) 220. Accordingly, in some embodiments, rather than directly applying energy to the flow control mechanism 206, a clinician can use the remote device 218 to adjust the shunting element 202 using energy stored in the energy storage component(s) 220. This permits the clinician to decouple the process of (a) applying energy to the energy receiving component(s) 224, and (b) adjusting the shunting element 202. Accordingly, the energy storage component(s) 220 may store energy for a period of time (e.g., hours, days, months, etc.) and, upon a determination that the flow through the shunting element 202 should be changed, a user can direct the energy storage component(s) 220 to release stored energy and direct it to one or more aspects of the flow control mechanism 206. In other embodiments, the system 200 (e.g., the processor 210) can automatically direct the energy storage component(s) 220 to release stored energy and direct it the flow control mechanism 206 to adjust the shunting element 202.

As described above, the active electronic components of the system 200 can have different power consumption characteristics, while the energy sources associated with the system 200 can have different power output characteristics. To improve efficiency and performance, the system 200 can implement a power management scheme to optimize or otherwise improve the manner in which the active electronic components are powered by the energy sources. Accordingly, rather than allowing power allocation to be passively dictated by the inherent characteristics of the active electronic components, the system 200 (e.g., processor 210) can actively select and control which energy source(s) are used to power a particular active electronic component.

Figure 3:
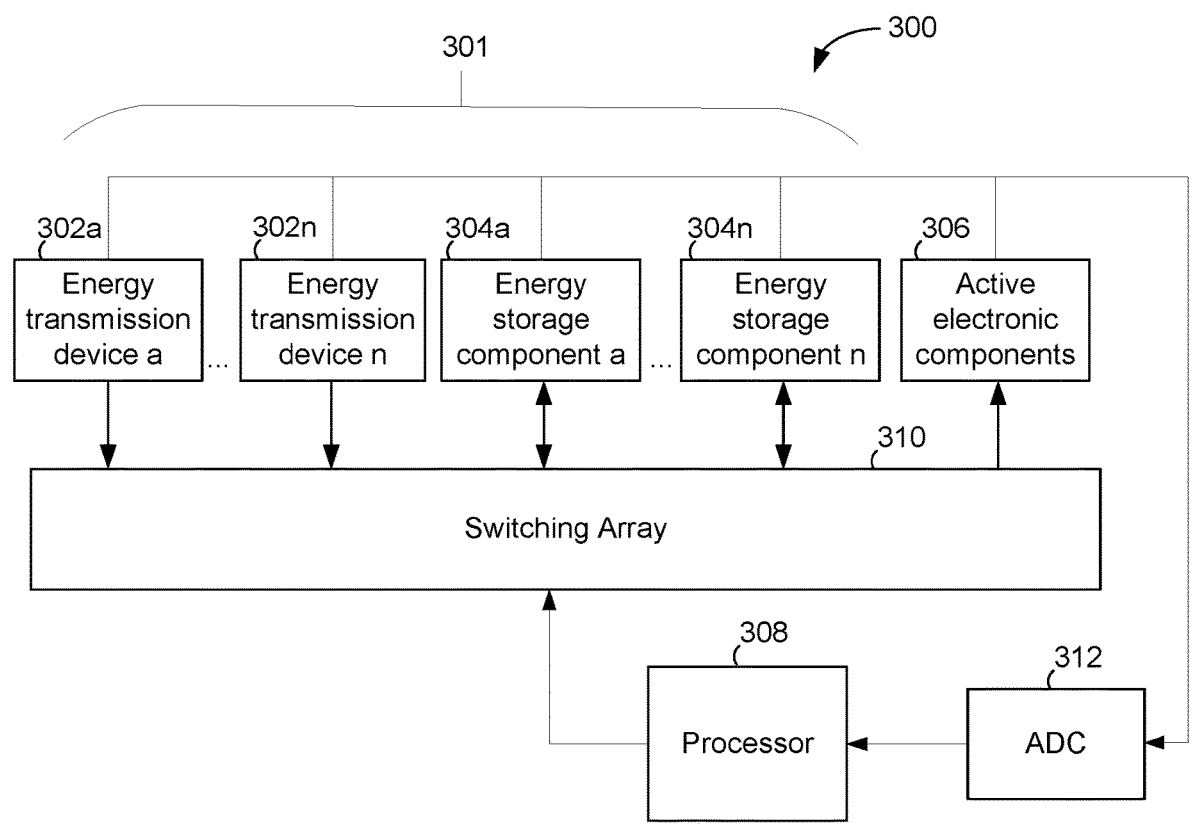
FIG. 3 is a schematic illustration of a power management system configured in accordance with an embodiment of the present technology.

FIG. 3 is a schematic illustration of a power management system 300 configured in accordance with an embodiment of the present technology. The system 300 can be incorporated in or otherwise combined with the interatrial shunting system 200 of FIG. 2 (e.g., as a power management subsystem), or into another implantable device. The system 300 includes a plurality of energy sources 301, such as one or more power transfer devices 302a-n and/or one or more energy storage components 304a-n. The energy sources 301 can be operably coupled to a plurality of active electronic components 306 to power the operation thereof.

The power transfer devices 302a-n, energy storage components 304a-n, and active electronic components 306 can be identical or generally similar to the corresponding components described with respect to FIG. 2. For example, the power transfer devices 302a-n can be located outside the patient's body and be configured to transmit power to an implanted component (e.g., energy receiving component(s) 224 of FIG. 2). The power transfer devices 302a-n can include a high power transfer device (e.g., for clinical use) and/or a low power transfer device (e.g., for home use). Although the power transfer devices 302a-n are depicted schematically as being directly connected to other components of the system 300 (e.g., switching array 310), one of ordinary skill in the art will appreciate that the power transfer devices 302a-n can be indirectly connected to the other components via one or more implanted energy receiving components (omitted from FIG. 3 merely for purposes of clarity). Accordingly, any description herein of power transmission between a power transfer device and another system component can include (a) power transmission from the power transfer device to an energy receiving component, and (b) power transmission from the energy receiving component to the system component.

The energy storage components 304a-n can be implantable in the patient and can include any suitable combination of a primary battery, a secondary battery, a supercapacitor, and/or a capacitor. In some embodiments, some energy storage components 304a-n can be charged and/or recharged by other energy storage components 304a-n and/or by the power transfer devices 302a-n. The active electronic components 306 can include a flow control mechanism, one or more sensors, a processor, a memory, a communication device, or other electronic components, as previously described. The active electronic components 306 can operate using power from one or more energy sources 301.

The system 300 can further include a processor 308 (e.g., a microprocessor). The processor 308 can be identical or generally similar to the processor 210 of FIG. 2, and can be implanted in the patient's body and/or carried by a shunting element (not shown). The processor 308 can be operably coupled to a memory (e.g., memory 212 of FIG. 2—not shown) storing instructions for performing the various methods described herein. In some embodiments, the processor 308 can be configured to implement a method for managing transmission of power from the energy transmission devices 302a-n and/or energy storage components 304a-n to the active electronic components 306, as described in greater detail below.

The processor 308 can be operably coupled to a switching array or switching apparatus 310 that is implantable in the patient's body and/or carried by the shunting element. The switching array 310 can include an array or matrix of switches or interconnections for electrically coupling one or more energy sources 301 to one or more active electronic components 306 to allow for power transmission. For example, the switching array 310 can electrically couple one or more power transfer devices 302a-n (or one or more energy receiving components associated with the power transfer devices 302a-n) to one or more active electronic components 306 to directly power the operation of the active electronic component(s) 306. The switching array 310 can also electrically couple one or more power transfer devices 302a-n (or one or more energy receiving components associated with the power transfer devices 302a-n) to one or more energy storage components 304a-n to charge and/or recharge the energy storage component(s) 304a-n. The switching array 310 can also electrically couple one or more energy storage components 304a-n to one or more active electronic components 306 to power the operation of the active electronic component(s) 306. When changes in the power management scheme of the system 300 are desired, the processor 308 can transmit signals to the switching array 310 to alter the configuration thereof to change the electrical interconnections between the energy sources 301 and the active electronic components 306.

The processor 308 can also be operably coupled to the energy sources 301 and active electronic components 306 to allow for data transmission. In some embodiments, the processor 308 transmits data to and/or receives data from the energy sources 301 and/or active electronic components 306 (e.g., directly or indirectly via the switching array 310). For example, the processor 308 can transmit control signals to the energy sources 301 and/or active electronic components 306 to control the operation thereof. The processor 308 can also receive data from the energy sources 301 and/or active electronic components 306. The data can indicate, for example, the operational status and/or other parameters of the respective component (e.g., whether the component is currently operating, whether the component is operating properly, whether the component has malfunctioned, the charge status of an energy storage component, whether an energy storage component should be recharged, the number of charge cycles of an energy storage component, sensor data provided by a component, etc.). In some embodiments, the processor 308 can store the data in a memory (e.g., memory 212 of FIG. 2—not shown), e.g., to aid in power management as described below. Additionally, the system 300 can include an ADC 312 to allow the processor 308 to measure physical quantities such as voltage, current, and/or temperature that are utilized in operation of the power management scheme. In other embodiments the ADC 312 is optional and can be omitted.

Figure 4:
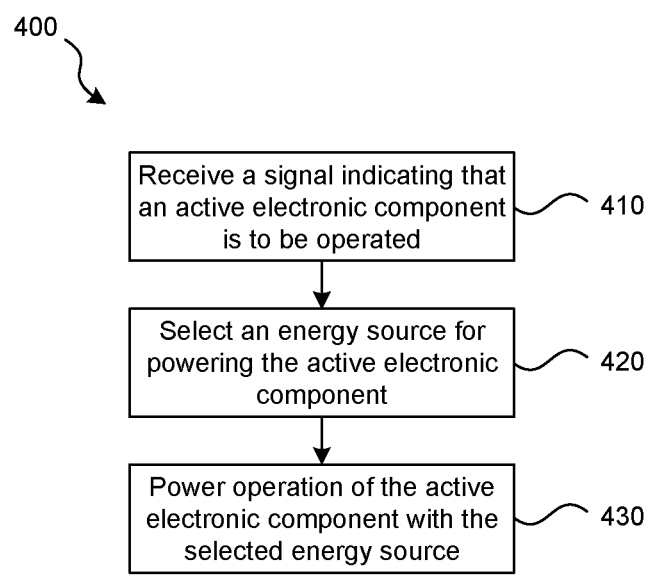
FIG. 4 is a block diagram illustrating a method for operating an interatrial shunting system configured in accordance with an embodiment of the present technology.

FIG. 4 is a block diagram illustrating a method 400 for operating an interatrial shunting system or another implanted system configured in accordance with an embodiment of the present technology. The method 400 can be implemented by any embodiment of the systems and devices described herein (e.g., system 200 of FIG. 2, system 300 of FIG. 3). In some embodiments, some or all of the steps of the method 400 are performed by a processor implanted in the patient's body (e.g., processor 210 of FIG. 2, processor 308 of FIG. 3) and configured to execute instructions stored in a memory (e.g., memory 212 of FIG. 2) for performing the operations described herein. In other embodiments, however, the method 400 may be implemented by other suitable systems/devices.

The method 400 can include receiving (e.g., via the processor) a signal indicating that at least one active electronic component is to be operated (block 410). The active electronic component can be any component carried by or otherwise associated with a shunting element of an interatrial shunting system, as previously described. For example, the active electronic component can be a flow control mechanism, one or more sensors, a communication device, a processor, a memory, or another electronic component. The active electronic component can be associated with a corresponding set of power consumption characteristics. For example, the active electronic component can have a maximum, minimum, and/or average power consumption value during operation.

In some embodiments, the signal is transmitted to the processor from a device or component internal to the patient. For example, a clock circuit can be configured to automatically transmit a signal to the processor at a specified time interval (e.g., a particular number of times per hour, day, week, month, etc.). The signal can indicate that one or more automatic time-based operations (e.g., periodic monitoring of patient and/or shunting parameters via one or more sensors, periodic adjustments to the shunting element) are to be performed. In some embodiments, the processor and/or other system components remain in standby mode (e.g., are unpowered) until the processor receives the signal from the clock circuit.

Alternatively or in combination, the signal can be transmitted to the processor from a device external to the patient (e.g., remote device 218 of FIG. 2). The external signal can be transmitted to the processor when a user (e.g., a clinician) wishes to interact with the implanted system. For example, the signal can be used to establish communication between the implanted system (e.g., via communication device 214 of FIG. 2) and the external device, e.g., to transmit sensor data stored by the system. As another example, the signal can be used to initiate adjustments to the shunting element (e.g., via flow control mechanism 206 of FIG. 2). The external signal can trigger the processor and/or other system components to exit standby mode. Optionally, the signal can also be used to authenticate the external device (e.g., to confirm that the device is authorized to communicate with the implanted system) before any data transmission or adjustments can occur. In some embodiments, the external signal can be transmitted to the processor automatically without a direct action from a user (e.g., the signal is transmitted automatically each time the patient, and therefore the implanted system, is located near the external device).

The method 400 also includes selecting (e.g., via the processor) at least one energy source for powering the active electronic component (block 420). The energy source can be selected from a plurality of energy sources associated with the system, such as, one or more power transfer devices and/or one or more energy storage components. In some embodiments, some or all of the energy sources have different power output characteristics (e.g., maximum, minimum, and/or average power output) and/or other characteristics (e.g., energy density, power density, self-discharge time, cycle life). Accordingly, the method can include selecting an energy source that has a set of characteristics (e.g., power output characteristics and/or other characteristics) that are capable of accommodating the power consumption characteristics of the active electronic component to be operated. For example, the selected energy source can have a power output (e.g., maximum, minimum, and/or average output) that is greater than or equal to a corresponding power consumption (e.g., maximum, minimum, and/or average consumption) of the active electronic component.

In some embodiments, the selection of the energy source is based at least in part on other parameters and/or relevant data of the energy source. For example, the method can involve selecting an energy source that is sufficiently charged or otherwise has sufficient energy available to power the operation of the active electronic component. In some embodiments, historical data of the energy sources is used to determine whether an energy source is currently capable of powering the active electronic component. The historical data can include, for example, data regarding how many charging cycles each energy source has undergone, whether the energy source has been previously used, whether the energy source has been recharged after use, and so on. Alternatively or in combination, diagnostic data can be used to determine whether a particular energy source should be selected. The diagnostic data can include, for example, data regarding whether the energy source is functioning properly, whether the energy source is currently malfunctioning or has previously malfunctioned, whether the energy source is anticipated to malfunction, etc. Diagnostic data can be used to exclude energy sources that are not operating properly or are expected to malfunction.

In some embodiments, the method 400 includes selecting a single energy source to directly power the active electronic component. In other embodiments, however, the method 400 can include selecting two or more energy sources: a first energy source to power the active electronic component, and one or more additional energy sources to charge and/or recharge the first energy source. This approach can be advantageous in embodiments where the first energy source has a high power density and a low energy density (e.g., a capacitor or supercapacitor), while the additional energy source(s) have a low power density and a high energy density (e.g., a battery). In such embodiments, the first energy source can be used to power an active electronic component having a high power consumption (e.g., a flow control mechanism or a communication device), while the additional energy source(s) can be used to charge and/or recharge the first energy source when the first energy source is depleted. Optionally, the powering and charging steps can be repeated multiple times until the particular operation is completed. For example, a capacitor can be used to power the communication device to transmit segments of data intermittently, while being recharged slowly from a battery between each transmission segment.

Optionally, the selection of energy sources can also vary based on the total amount of power consumed by a particular operation to be performed. For example, energy storage components with a relatively high power output and/or power density (e.g., a supercapacitor, a capacitor) can be used for operations involving high power consumption (e.g., shunt adjustment, remote communication), while energy storage components having a relatively low power output and/or power density (e.g., a battery) can be reserved for operations involving low power consumption (e.g., standby, acquire sensor data). In some embodiments, for example, if the implanted system includes a primary battery and a supercapacitor, the primary battery can be used to provide power for relatively low power operations (e.g., standby, acquire sensor data). For operations involving higher power consumption (e.g., remote communication, shunt adjustment), the primary battery can be used to charge the supercapacitor before the operation commences. The supercapacitor can then provide power to the active electronic components that perform the operation.

The selection of energy sources can also depend on whether an external energy source is available. The external energy source can be preferentially used for high power operations, either to provide power directly to the active electronic component or to charge an energy storage component that powers the active electronic component. For example, if the implanted system includes a battery (e.g., a primary or a secondary battery) and a supercapacitor, the external energy source can be used to charge the supercapacitor for powering for high power operations, while the battery can provide power for low power operations and/or when the external energy source is not available. When a shunt adjustment is desired, for example, a high power external power transfer device (e.g., a clinical charging device) can be used to charge the supercapacitor, and the supercapacitor can be used to power the shunt adjustment operation. This approach is expected to increase the useable life of the battery, and can also provide a back-up method for shunt adjustment in case the battery fails. Optionally, if the patient has regular access to a low power external power transfer device (e.g., a home use recharging device), the device can be used to charge the supercapacitor for most or all operations. The battery can be used solely for low power operations (e.g., standby, acquire sensor data) in situations where the external power transfer device is not available or is not operating properly.

In some embodiments, selecting the energy source further includes ranking some or all of the energy sources, with higher-ranked energy sources selected before lower-ranked energy sources. This approach can be used, for example, in situations where multiple energy sources are available for powering the active electronic component. The ranking can be performed based on the power output characteristics and/or other data of the energy sources. In some embodiments, the ranking is based at least in part on a priority algorithm specifying the order in which different energy sources should preferentially be used. For example, the priority algorithm can include one or more of the following ranking schemes: (a) ranking energy sources having higher power density above energy sources having lower power density, (b) ranking rechargeable energy sources above non-rechargeable energy sources, (c) ranking energy sources external to the patient above energy sources implanted in the patient, and/or (d) ranking energy sources with greater available and/or remaining energy capacity above energy sources with diminished energy capacity. Optionally, the ranking implemented by the priority algorithm can differ depending on whether an external energy source is available. In some embodiments, for example, external energy sources are prioritized over implanted energy sources, e.g., to increase the useable lifetime of the implanted energy sources and/or avoid frequent recharging of the implanted energy sources. In an alternative embodiment, a priority algorithm ranks available energy sources with regard to the best fit with the power requirements of the component(s) to be activated and/or the operation(s) to be performed. For example, the algorithm can select an energy source of combination of energy sources that provide the minimal amount of power necessary to successfully complete an operation.

Table 3 below shows an example ranking scheme for energy sources that may be implemented by a priority algorithm configured in accordance with a particular embodiment of the present technology. The different rows indicate whether an external energy source is available and, if so, the amount of power delivered to the energy receiving component associated with that source (e.g., high power can correspond to approximately 1 W and lower power can correspond to approximately 10 mW). Within each cell of Table 3, items are arranged vertically in order of priority, with higher energy sources prioritized over lower energy sources when available. For example, for an acquire sensor data operation performed when there is no external energy source, the algorithm can prioritize a supercapacitor over a secondary battery, and the secondary battery over a primary battery. If a higher-ranked energy source is unavailable, the algorithm can revert to lower-ranked energy sources according to the listed order.

Additionally, in Table 3 the nomenclature "X to Y" indicates that energy source X is used to recharge energy source Y, and energy source Y is subsequently used for powering the specified operation. For example, for a remote communication operation performed when a high power external energy source is available, the external energy source can be used to charge the capacitor, and the capacitor can subsequently be used to power a communication device that performs the remote communication. The charging and powering steps can be repeated multiple times to complete the remote communication operation, if appropriate.

the active electronic component, the selected energy source, and/or another system component to cause the active electronic component to operate while being powered by the selected energy source. In some embodiments, for example, a switching array or other interconnection structure (e.g., switching array 310) can be used to electrically couple the selected energy source to the active electronic component to allow for power transmission thereto. The processor can cause the selected energy source to power the active electronic component by adjusting the configuration of the switching array accordingly. Optionally, energy sources that were not selected can be electrically decoupled from the active electronic component so that power is not transmitted to the active electronic component by those sources. In embodiments where a first energy source is used to charge or recharge a second energy source that is subsequently used to power the active electronic component, the switching array can electrically couple the first energy source to the second energy source before electrically coupling the second energy source to the active electronic component.

Operation of the active electronic component can be performed as previously described. For example, such operations can include adjusting a shunting element via a flow control mechanism, acquiring sensor data via one or

TABLE 3

Example ranking scheme for energy sources

| | Standby | Acquire Sensor Data | Remote Communication | Shunt Adjustment |
|---|---|---|---|---|
| No external energy source | Supercapacitor Secondary Primary | Supercapacitor Secondary Primary | Primary to Supercapacitor Primary to capacitor Secondary to capacitor | Primary to Supercapacitor; Secondary to supercapacitor |
| Low power external energy source | External | External to capacitor/supercapacitor Supercapacitor Secondary Primary | External to capacitor/supercapacitor Supercapacitor Secondary Primary | External to supercapacitor |
| High power external energy source | External | External | External External to capacitor/supercapacitor | External External to supercapacitor |

Primary = primary battery;
Secondary = secondary battery;
External = external energy source As shown in the example ranking scheme provided in Table 3, within embodiments under some operating circumstances some options may not be available. For example, in some embodiments, shunt adjustment (e.g., via flow control mechanism 206) with no external energy source available may not be reliably or practically achievable. In other embodiments, however, these options may become more reliable and/or viable (e.g., in some systems, a shunt adjustment could be made by using a battery to charge a supercapacitor). Further, in some embodiments, some options may be available but not optimal and/or practical. For example, in the system corresponding to the example ranking scheme provided in Table 3, performing a shunt adjustment with only a low power external energy source available may be possible, but could possibly take an undesirable amount of time for the external source to sufficiently charge a supercapacitor.

The method 400 further includes powering operation of the active electronic component with the selected energy source (block 430). The processor can send instructions to more sensors, transmitting data to and/or receiving data from a remote device, and so on.

Some or all of the steps of the method 400 can be repeated multiple times to provide power management for different active electronic components and/or system operations. In some embodiments, for example, the method 400 can further include receiving a second signal indicating that a second active electronic component with different power consumption characteristics is to be operated. The method 400 can subsequently include selecting a second, different energy source to power the second active electronic component, and causing the second energy source to power the operation of the second active electronic component.

As one of skill in the art will appreciate from the disclosure herein, various components of the methods and interatrial shunting systems described above can be omitted without deviating from the scope of the present technology. Likewise, additional components not explicitly described above may be added to the methods and interatrial shunting systems without deviating from the scope of the present technology. Accordingly, the methods, devices, and systems described herein are not limited to those configurations expressly identified, but rather encompasses variations and alterations of the described methods, devices and systems. Some or all of the aspects of the methods, devices, and systems described herein can be utilized independently of an interatrial shunting system, for example as part of another implanted medical device.

EXAMPLES

Several aspects of the present technology are set forth in the following examples:
1. A system for shunting blood between a left atrium and a right atrium of a patient, the system comprising:
   a shunting element configured to be implanted in the patient;
   a plurality of active electronic components carried by the shunting element, wherein at least some of the active electronic components have different power consumption characteristics;
   a plurality of energy storage components operably coupled to the shunting element, wherein at least some of the energy storage components have different power output characteristics;
   a processor; and
   a memory storing instructions that, when executed by the processor, cause the system to perform operations comprising—
      receiving a signal indicating that an active electronic component is to be operated, the active electronic component associated with power consumption characteristics,
      selecting an energy storage component associated with power output characteristics capable of accommodating the power consumption characteristics of the active electronic component, and
      instructing the selected energy storage component to power operation of the active electronic component.
2. The system of example 1 wherein the plurality of active electronic components includes two or more of the following: a flow control mechanism, a communication device, a sensor, a memory, or a processor.
3. The system of example 1 or example 2 wherein the active electronic components include a first active electronic component having a power consumption greater than or equal to 1 W, and a second active electronic component having a power consumption less than or equal to 1 mW.
4. The system of any one of examples 1-3 wherein the plurality of energy storage components includes at least one rechargeable energy storage component and at least one non-rechargeable energy storage component.
5. The system of any one of examples 1-4 wherein the plurality of energy storage components comprises:
   at least one of a primary battery or a second battery; and
   at least one of a supercapacitor or a capacitor.
6. The system of any one of examples 1-5, further comprising a switching array configured to electrically couple the plurality of active electronic components and the plurality of energy storage components.
7. The system of example 6 wherein the operations further comprise altering a configuration of the switching array to cause the selected energy storage component to power the operation of the active electronic component.
8. The system of any one of examples 1-7, further comprising an energy receiving component carried by the shunting element, wherein the energy receiving component is configured to receive power from a source external to the patient.
9. The system of example 8 wherein the energy receiving component is operably coupled to at least one of the energy storage components to provide power thereto.
10. A system for shunting fluid between a first body region of a patient and a second body region of the patient, the system comprising:
   a shunting element having a lumen extending therethrough, wherein, when the shunting element is implanted in the patient, the lumen is configured to fluidly couple the first body region and the second body region;
   a plurality of active electronic components carried by the shunting element, the active electronic components including a flow control mechanism, a sensor, and a communication device, wherein at least some of the active electronic components have different power consumption characteristics;
   a plurality of energy storage components carried by the shunting element, the energy storage components including at least one battery and at least one of a supercapacitor or a capacitor, wherein at least some of the energy storage components have different power output characteristics;
   a processor; and
   a memory storing instructions that, when executed by the processor, cause the system to perform operations comprising—
      receiving a signal indicating that an active electronic component is to be operated, the active electronic component having a set of power consumption characteristics,
      selecting an energy storage component having a set of power output characteristics capable of accommodating the power consumption characteristics of the active electronic component, and
      instructing the active electronic component to operate while powered by the selected energy storage component.
11. The system of example 10 wherein the active electronic components include a first active electronic component having a power consumption greater than or equal to 1 W, and a second active electronic component having a power consumption less than or equal to 1 mW.
12. The system of example 10 or example 11 wherein the plurality of energy storage components includes at least one rechargeable energy storage component and at least one non-rechargeable energy storage component.
13. The system of any one of examples 10-12, further comprising a switching array configured to electrically couple the plurality of active electronic components and the plurality of energy storage components.
14. The system of example 13 wherein the operations further comprise altering a configuration of the switching array to cause the selected energy storage component to power the operation of the active electronic component.
15. The system of any one of examples 10-14, further comprising an energy receiving component carried by the shunting element, wherein the energy receiving component is configured to receive power from a source external to the patient.
16. A method of operating an interatrial shunting system including a shunting element implanted in a patient's heart, the method comprising:

receiving, at a processor implanted in the patient's heart, a signal indicating that an active electronic component carried by the shunting element is to be operated, wherein the active electronic component has a set of power consumption characteristics;

selecting, via the processor, an energy source from a plurality of energy sources for powering the active electronic component, wherein at least some of the energy sources have different power output characteristics, and wherein the selected energy source has a set of power output characteristics capable of accommodating the power consumption characteristics of the active electronic component; and powering operation of the active electronic component with the selected energy source.

17. The method of example 16 wherein the active electronic component comprises a flow control mechanism, and wherein the method further comprises adjusting an amount of blood flow through the shunting element via the flow control mechanism.

18. The method of example 16 or example 17 wherein the active electronic component comprises a sensor, and wherein the method further comprises measuring a parameter of the patient or the shunting element via the sensor.

19. The method of any one of examples 16-18 wherein the active electronic component comprises a communication device, and wherein the method further comprises transmitting data to a device external to the patient via the communication device.

20. The method of any one of examples 16-19 wherein the plurality of energy sources includes at least one energy source external to the patient and at least one energy source implanted in the patient.

21. The method of any one of examples 16-20 wherein the plurality of energy sources comprises two or more of: a primary battery, a secondary battery, a supercapacitor, or a capacitor.

22. The method of any one of examples 16-21, further comprising ranking the plurality of energy sources based at least in part on a priority algorithm.

23. The method of example 22 wherein the ranking the plurality of energy sources comprises one or more of:
ranking energy sources having higher power density above energy sources having lower power density;
ranking rechargeable energy sources above non-rechargeable energy sources; or
ranking energy sources external to the patient above energy sources implanted in the patient.

24. The method of any one of examples 16-23 wherein the energy source is selected based, at least in part, on historical data of at least some of the energy sources.

25. The method of any one of examples 16-24 wherein the energy source is selected based, at least in part, on diagnostic data of at least some of the energy sources.

26. The method of any one of examples 16-25 wherein the active electronic component is a first active electronic component and the selected energy source is a first energy source, and the method further comprises:
receiving, at the processor, a second signal indicating that a second active electronic component carried by the shunting element is to be operated, wherein the second active electronic component has a second set of power consumption characteristics different from the set of power consumption characteristics of the first active electronic component; and
selecting, via the processor, a second energy source from the plurality of energy sources for powering the second active electronic component, wherein the second energy source is different from the first energy source.

27. The method of any one of examples 16-26 wherein the selected energy source is a first energy source, and the method further comprises:
selecting, via the processor, a second energy source from the plurality of energy sources; and
charging the first energy source with the second energy source before powering the operation of the active electronic component with the first energy source.

28. The method of any one of examples 16-27 wherein the signal is received from a device implanted in the patient.

29. The method of any one of examples 16-28 wherein the signal is received from a device external to the patient.

30. A system for shunting blood between a left atrium and a right atrium of a patient, the system comprising:
a shunting element configured to be implanted in the patient;
a plurality of active electronic components carried by the shunting element, wherein at least some of the active electronic components have different power consumption characteristics;
a plurality of energy storage components operably coupled to the shunting element, wherein at least some of the energy storage components have different power output characteristics;
a switching apparatus configured to provide variable connections between the plurality of active electronic components and the plurality of energy storage components based, at least in part, on power consumption characteristics of the individual active electronic components.

31. The system of example 30 wherein the active electronic components include a first active electronic component having a power consumption greater than or equal to 1 W, and a second active electronic component having a power consumption less than or equal to 1 mW.

32. The system of example 30 or 31 wherein the plurality of energy storage components comprises (a) at least one of a primary battery or a second battery and (b) at least one of a supercapacitor or a capacitor.

CONCLUSION

Embodiments of the present disclosure may include some or all of the following components: a battery, supercapacitor, or other suitable power source; a microcontroller, FPGA, ASIC, or other programmable component or system capable of storing and executing software and/or firmware that drives operation of an implant; non-programmable components (e.g., diodes, comparators, gates, MOSFETS, etc.) that drive operation of an implant; memory such as RAM or ROM to store data and/or software/firmware associated with an implant and/or its operation; wireless communication hardware such as an antenna system configured to transmit via Bluetooth, WiFi, or other protocols known in the art; energy harvesting means, for example a coil or antenna which is capable of receiving and/or reading an externally-provided signal which may be used to power the device, charge a battery, initiate a reading from a sensor, or for other purposes. Embodiments may also include one or more sensors, such as pressure sensors, impedance sensors, accelerometers, force/strain sensors, temperature sensors, flow sensors, optical sensors, cameras, microphones or other acoustic sensors, ultrasonic sensors, ECG or other cardiac rhythm sensors, SpO2 and other sensors adapted to measure tissue and/or blood gas levels, blood volume sensors, and other sensors known to those who are skilled in the art. Embodiments may include portions that are radiopaque and/or ultrasonically reflective to facilitate image-guided implantation or image guided procedures using techniques such as fluoroscopy, ultrasonography, or other imaging methods. Embodiments of the system may include specialized delivery catheters/systems that are adapted to deliver an implant and/or carry out a procedure. Systems may include components such as guidewires, sheaths, dilators, and multiple delivery catheters. Components may be exchanged via over-the-wire, rapid exchange, combination, or other approaches.

Embodiments of the present disclosure may be implemented as computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Computer-executable instructions may be stored in memory, such as RAM, ROM, flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments. For example, although this disclosure has been written to describe devices that are generally described as being used to create a path of fluid communication between the LA and RA, the LV and the right ventricle (RV), or the LA and the coronary sinus, it should be appreciated that similar embodiments could be utilized for shunts between other chambers of heart or for shunts in other regions of the body.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. A system for shunting blood between a left atrium and a right atrium of a patient, the system comprising:
   a shunting element configured to be implanted in the patient;
   a plurality of active electronic components carried by the shunting element, wherein at least some of the active electronic components have different power consumption characteristics;
   a plurality of energy storage components operably coupled to the shunting element, wherein at least some of the energy storage components have different power output characteristics;
   a processor; and
   a memory storing instructions that, when executed by the processor, cause the system to perform operations comprising—
      receiving a signal indicating that an active electronic component is to be operated, the active electronic component associated with power consumption characteristics,
      selecting an energy storage component associated with power output characteristics capable of accommodating the power consumption characteristics of the active electronic component, and
      instructing the selected energy storage component to power operation of the active electronic component.

2. The system of claim 1 wherein the plurality of active electronic components includes two or more of the following: a flow control mechanism, a communication device, a sensor, a memory, or a processor.

3. The system of claim 1 wherein the active electronic components include a first active electronic component having a power consumption greater than or equal to 1 W, and a second active electronic component having a power consumption less than or equal to 1 mW.

4. The system of claim 1 wherein the plurality of energy storage components includes at least one rechargeable energy storage component and at least one non-rechargeable energy storage component.

5. The system of claim 1 wherein the plurality of energy storage components comprises:
at least one of a primary battery or a second battery; and
at least one of a supercapacitor or a capacitor.

6. The system of claim 1, further comprising a switching array configured to electrically couple the plurality of active electronic components and the plurality of energy storage components.

7. The system of claim 6 wherein the operations further comprise altering a configuration of the switching array to cause the selected energy storage component to power the operation of the active electronic component.

8. The system of claim 1, further comprising an energy receiving component carried by the shunting element, wherein the energy receiving component is configured to receive power from a source external to the patient.

9. The system of claim 8 wherein the energy receiving component is operably coupled to at least one of the energy storage components to provide power thereto.

10. A method of operating an interatrial shunting system including a shunting element implanted in a patient's heart, the method comprising:
receiving, at a processor implanted in the patient's heart, a signal indicating that an active electronic component carried by the shunting element is to be operated, wherein the active electronic component has a set of power consumption characteristics;
selecting, via the processor, an energy source from a plurality of energy sources for powering the active electronic component, wherein at least some of the energy sources have different power output characteristics, and wherein the selected energy source has a set of power output characteristics capable of accommodating the power consumption characteristics of the active electronic component; and
powering operation of the active electronic component with the selected energy source.

11. The method of claim 10 wherein the active electronic component comprises a flow control mechanism, and wherein the method further comprises adjusting an amount of blood flow through the shunting element via the flow control mechanism.

12. The method of claim 10 wherein the active electronic component comprises a sensor, and wherein the method further comprises measuring a parameter of the patient or the shunting element via the sensor.

13. The method of claim 10 wherein the active electronic component comprises a communication device, and wherein the method further comprises transmitting data to a device external to the patient via the communication device.

14. The method of claim 10 wherein the plurality of energy sources includes at least one energy source external to the patient and at least one energy source implanted in the patient.

15. The method of claim 10 wherein the plurality of energy sources comprises two or more of: a primary battery, a secondary battery, a supercapacitor, or a capacitor.

16. The method of claim 10, further comprising ranking the plurality of energy sources based at least in part on a priority algorithm.

17. The method of claim 16 wherein the ranking the plurality of energy sources comprises one or more of:
ranking energy sources having higher power density above energy sources having lower power density;
ranking rechargeable energy sources above non-rechargeable energy sources; or
ranking energy sources external to the patient above energy sources implanted in the patient.

18. The method of claim 10 wherein the energy source is selected based, at least in part, on historical data of at least some of the energy sources.

19. The method of claim 10 wherein the energy source is selected based, at least in part, on diagnostic data of at least some of the energy sources.

20. The method of claim 10 wherein the active electronic component is a first active electronic component and the selected energy source is a first energy source, and the method further comprises:
receiving, at the processor, a second signal indicating that a second active electronic component carried by the shunting element is to be operated, wherein the second active electronic component has a second set of power consumption characteristics different from the set of power consumption characteristics of the first active electronic component; and
selecting, via the processor, a second energy source from the plurality of energy sources for powering the second active electronic component, wherein the second energy source is different from the first energy source.

21. The method of claim 10 wherein the selected energy source is a first energy source, and the method further comprises:
selecting, via the processor, a second energy source from the plurality of energy sources; and
charging the first energy source with the second energy source before powering the operation of the active electronic component with the first energy source.

22. The method of claim 10 wherein the signal is received from a device implanted in the patient.

23. The method of claim 16 wherein the signal is received from a device external to the patient.

24. A system for shunting blood between a left atrium and a right atrium of a patient, the system comprising:
a shunting element configured to be implanted in the patient;
a plurality of active electronic components carried by the shunting element, wherein at least some of the active electronic components have different power consumption characteristics;
a plurality of energy storage components operably coupled to the shunting element, wherein at least some of the energy storage components have different power output characteristics;
a switching apparatus configured to provide variable connections between the plurality of active electronic components and the plurality of energy storage components based, at least in part, on power consumption characteristics of the individual active electronic components.

25. The system of claim 24 wherein the active electronic components include a first active electronic component having a power consumption greater than or equal to 1 W, and a second active electronic component having a power consumption less than or equal to 1 mW.

26. The system of claim 24 wherein the plurality of energy storage components comprises (a) at least one of a primary battery or a second battery and (b) at least one of a supercapacitor or a capacitor.

* * * * *